United States Patent
Lee et al.

(10) Patent No.: US 11,838,614 B2
(45) Date of Patent: Dec. 5, 2023

(54) LENS DRIVING UNIT, AND CAMERA MODULE AND OPTICAL APPARATUS INCLUDING SAME

(71) Applicant: LG INNOTEK CO., LTD., Seoul (KR)

(72) Inventors: Kap Jin Lee, Seoul (KR); Hyun Soo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/677,489

(22) Filed: Feb. 22, 2022

(65) Prior Publication Data

US 2022/0174192 A1 Jun. 2, 2022

Related U.S. Application Data

(63) Continuation of application No. 16/603,032, filed as application No. PCT/KR2018/003957 on Apr. 4, 2018, now Pat. No. 11,283,974.

(30) Foreign Application Priority Data

Apr. 5, 2017 (KR) .................. 10-2017-0044175
Apr. 5, 2017 (KR) .................. 10-2017-0044180

(51) Int. Cl.
*H04N 23/54* (2023.01)
*G03B 5/02* (2021.01)
(Continued)

(52) U.S. Cl.
CPC ............... *H04N 23/54* (2023.01); *G03B 5/02* (2013.01); *H04N 23/55* (2023.01); *G03B 1/02* (2013.01); *G03B 13/36* (2013.01)

(58) Field of Classification Search
None
See application file for complete search history.

(56) References Cited

U.S. PATENT DOCUMENTS 9,151,963 B2   10/2015  Sato et al.
9,599,838 B2    3/2017  Park et al.
(Continued)

FOREIGN PATENT DOCUMENTS

CN    104902149 A    9/2015
CN    105988177 A   10/2016
(Continued)

OTHER PUBLICATIONS

English translation of KR20150054719 A, Jeon et al., Jan. 2015 (Year: 2015).*

(Continued)

*Primary Examiner* — James M Hannett
(74) *Attorney, Agent, or Firm* — Birch, Stewart, Kolasch & Birch, LLP

(57) ABSTRACT

An embodiment includes a housing, a bobbin disposed in the housing, a first coil disposed on the bobbin, a magnet disposed in the housing, an upper spring coupled to an upper part of the bobbin and an upper part of the housing, a circuit substrate disposed under the housing, a support member electrically connecting the upper spring and the circuit substrate, and a damper disposed on the upper spring, wherein the upper spring includes an outer side portion coupled to the housing, a first coupling portion coupled to the support member, and a first connecting portion which connects the outer side portion and the first coupling portion, the first coupling portion further including a first extension extending from the first coupling portion toward the outer side portion, the first extension is spaced apart from the outer side portion, and the damper connects the first extension and the outer side portion.

20 Claims, 16 Drawing Sheets

(51) Int. Cl.
*H04N 23/55* (2023.01)
*G03B 13/36* (2021.01)
*G03B 1/02* (2021.01)

(56) References Cited

U.S. PATENT DOCUMENTS

| | | |
|---|---|---|
| 10,345,614 B2 | 7/2019 | Ichihashi |
| 10,620,396 B2 | 4/2020 | Cho et al. |
| 2012/0314307 A1 | 12/2012 | Ikushima et al. |
| 2013/0016428 A1 | 1/2013 | Sugawara et al. |
| 2013/0039640 A1 | 2/2013 | Sekimoto |
| 2014/0355120 A1 | 12/2014 | Yeo |
| 2018/0113322 A1 | 4/2018 | Sugawara et al. |

FOREIGN PATENT DOCUMENTS

| | | |
|---|---|---|
| JP | 2011-102823 A | 5/2011 |
| JP | 2013-24944 A | 2/2013 |
| JP | 2013-167860 A | 8/2013 |
| JP | 2015-184373 A | 10/2015 |
| JP | 2015-191213 A | 11/2015 |
| JP | 2016-180879 A | 10/2016 |
| JP | 2016-537885 A | 12/2016 |
| JP | 2017-3958 A | 1/2017 |
| JP | 2017-21365 A | 1/2017 |
| KR | 20150054719 A * | 1/2015 |
| KR | 10-2015-0054719 A | 5/2015 |
| KR | 10-2015-0071354 A | 6/2015 |
| KR | 10-2015-0097998 A | 8/2015 |
| KR | 10-2016-0073763 A | 6/2016 |
| KR | 10-2016-0094636 A | 8/2016 |
| KR | 10-1657511 B1 | 9/2016 |
| KR | 10-2017-0029986 A | 3/2017 |
| KR | 10-2016-0023386 A | 3/2018 |
| WO | WO 2017/119780 A1 | 7/2017 |

OTHER PUBLICATIONS

English translation of KR 20150054719 A Jeon et al (Year: 2015).
U.S. Appl. No. 16/603,032, filed Oct. 4, 2019.

* cited by examiner

LENS DRIVING UNIT, AND CAMERA MODULE AND OPTICAL APPARATUS INCLUDING SAME

CROSS REFERENCE TO RELATED APPLICATIONS

This application is a Continuation of copending U.S. application Ser. No. 16/603,032, filed on Oct. 4, 2019, which is the National Phase of PCT International Application No. PCT/KR2018/003957, filed on Apr. 4, 2018, which claims priority under 35 U.S.C. 119(a) to Patent Application Nos. 10-2017-0044175 and 10-2017-0044180, filed in the Republic of Korea on Apr. 5, 2017, all of which are hereby expressly incorporated by reference into the present application.

TECHNICAL FIELD

Embodiments relate to a lens moving apparatus and to a camera module and an optical device each including the same.

BACKGROUND ART

Technology of a voice coil motor (VCM), which is used in existing general camera modules, is difficult to apply to a miniature low-power camera module, and studies related thereto have been actively conducted.

In the case of a camera module configured to be mounted in a small electronic product, such as a smart phone, the camera module may frequently receive shocks when in use, and may undergo fine shaking due to, for example, the shaking of a user's hand. In consideration thereof, technology enabling a device for preventing handshake to be additionally installed to a camera module is being developed.

DISCLOSURE

Technical Problem

The embodiments provide a lens moving apparatus capable of preventing disconnection or damage to a second coil caused by external impacts, performing soldering of the second coil to an upper spring without an additional line arrangement, and preventing movement or vibration of the second coil, thereby improving solderability when soldering.

Technical Solution

A lens moving apparatus according to an embodiment comprises a housing, a bobbin disposed in the housing, a first coil disposed on the bobbin, a magnet disposed on the housing, an upper spring coupled both to an upper portion of the bobbin and to an upper portion of the housing, a circuit board disposed under the housing, a support member conductively connecting the upper spring to the circuit board, and a damper disposed on the upper spring, wherein the upper spring comprises an outer portion coupled to the housing, a first coupling portion coupled to the support member, and a first connecting portion connecting the outer portion to the first coupling portion, wherein the first coupling portion further comprises a first extension, which extends toward the outer portion from the first coupling portion, and wherein the first extension is spaced apart from the outer portion, and the damper connects the first extension to the outer portion.

The outer portion may be coupled to the housing at a corner of the housing.

The outer portion may include a second coupling portion disposed at a first side portion of the housing and coupled to the housing, a third coupling portion disposed at a second side portion adjacent to the first side portion of the housing and coupled to the housing, and a second connecting portion connecting the second coupling portion to the third coupling portion, wherein the first connecting portion comprises a third connecting portion connecting the second coupling portion to the first coupling portion, and a fourth connecting portion connecting the third coupling portion to the first coupling portion.

The damper may be disposed between the first extension and the second connecting portion, and the first extension may be spaced apart from each of the third and fourth connecting portions.

The first extension may include a second extension extending to the second coupling portion from the first coupling portion, a third extension extending to the third coupling portion from the first coupling portion, and a fourth extension extending to the second connecting portion from the first coupling portion.

The first extension may be increased in width moving toward the outer portion from the first coupling portion.

A portion of the first extension that corresponds to the outer portion may have a shape corresponding to a shape of the outer portion.

The first coupling portion may include a coupling region at which the support member is coupled to the first coupling portion, and the first coupling portion may have a first length longer than a second length of the first coupling portion, wherein the first length is a distance between the coupling region and one end of the first coupling portion which extends in a direction in which the first extension extends, and the second length is a distance between the coupling region and a remaining end of the first coupling portion which extends in a direction opposite the direction in which the first extension extends.

The lens moving apparatus may further include a second coil disposed on an outer surface of a side portion of the housing so as to generate induction voltage by interaction with the first coil. The housing may include first and second projections disposed on an upper surface thereof, and the upper spring may include a first spring and a second spring, wherein a portion of the second coil is wound at least one turn around the first projection and is connected to the first spring, and a remaining portion of the second coil is wound at least one turn around the second projection and is connected to the second spring.

A lens moving apparatus according to another embodiment comprises a housing including first and second projections disposed on an upper surface thereof, a bobbin disposed in the housing, a first coil disposed on the bobbin, a magnet disposed on the housing, a second coil disposed on an outer surface of the housing, and first and second springs, which are coupled both to an upper portion of the bobbin and to an upper portion of the housing, wherein a portion of the second coil is wound at least one turn around the first projection and is connected to the first spring, and a remaining portion of the second coil is wound at least one turn around the second projection and is connected to the second spring.

The second coil may include a first portion disposed on the outer surface of the housing, a second portion wound around the first projection, a third portion connecting one end of the first portion to one end of the second portion, a fourth portion wound around the second projection, and a fifth portion connecting the other end of the first portion to one end of the fourth portion.

The lens moving apparatus according to another embodiment may further include a first solder, conductively connecting the second portion of the second coil to the first spring, and a second solder, conductively connecting the fourth portion of the second coil to the second spring.

The second coil may further include a sixth portion extending to the first spring from the other end of the second portion, and a seventh portion, extending to the second spring from the other end of the fourth portion. The lens moving apparatus may further include a first solder, conductively connecting the sixth portion to the first spring, and a second solder, conductively connecting the seventh portion to the second spring.

The housing may include a first side portion, a second side portion, a third side portion, a fourth side portion, a first corner portion positioned between the first and second side portions, a second corner portion positioned between the second and third side portions, a third corner portion positioned between the third and fourth side portions, a fourth corner portion positioned between the fourth and first side portions, a first protrusion disposed on an upper surface of the first corner portion and coupled to the first spring, a second protrusion disposed on an upper surface of the first side portion and coupled to the first spring, a third protrusion disposed on an upper surface of the second corner portion and coupled to the second spring, and a fourth protrusion disposed on an upper surface of the third side portion and coupled to the second spring, wherein the first and second side portions face each other, and the second and fourth side portions face each other.

The first projection may be provided on the first side portion, which is positioned between the first and second protrusions, and the second projection may be provided on the third side portion, which is positioned between the third and fourth protrusions.

The outer surface of the housing may include a first groove in which the first portion of the second coil is disposed, a second groove, which is connected to the first groove and in which the third portion of the second coil is disposed, and a third groove, which is connected to the first groove and in which the fifth portion of the second coil is disposed.

The first spring may include a first zone, disposed at the first corner portion and coupled to the first protrusion, and a second zone, extending to an upper surface of the first side portion from the first zone and coupled to the second protrusion, and the second spring may include a third zone, disposed at the second corner portion and coupled to the third protrusion, and a fourth zone, extending to an upper surface of the third side portion from the third zone and coupled to the fourth protrusion.

The second groove may be positioned at an outer surface of the first side portion of the housing, the third groove may be positioned at an outer surface of the third side portion of the housing, and the second and third grooves may be positioned above the first groove.

The second coil may not overlap the first coil in a direction parallel to the optical axis and may not overlap the first coil in a direction perpendicular to the optical axis.

Advantageous Effects

Embodiments are able to prevent disconnection or damage to the second coil caused by external impacts, to perform soldering of the second coil to the upper spring without an additional line arrangement, and to prevent movement or vibration of the second coil, thereby improving solderability when soldering.

BEST MODE

Figure 1:
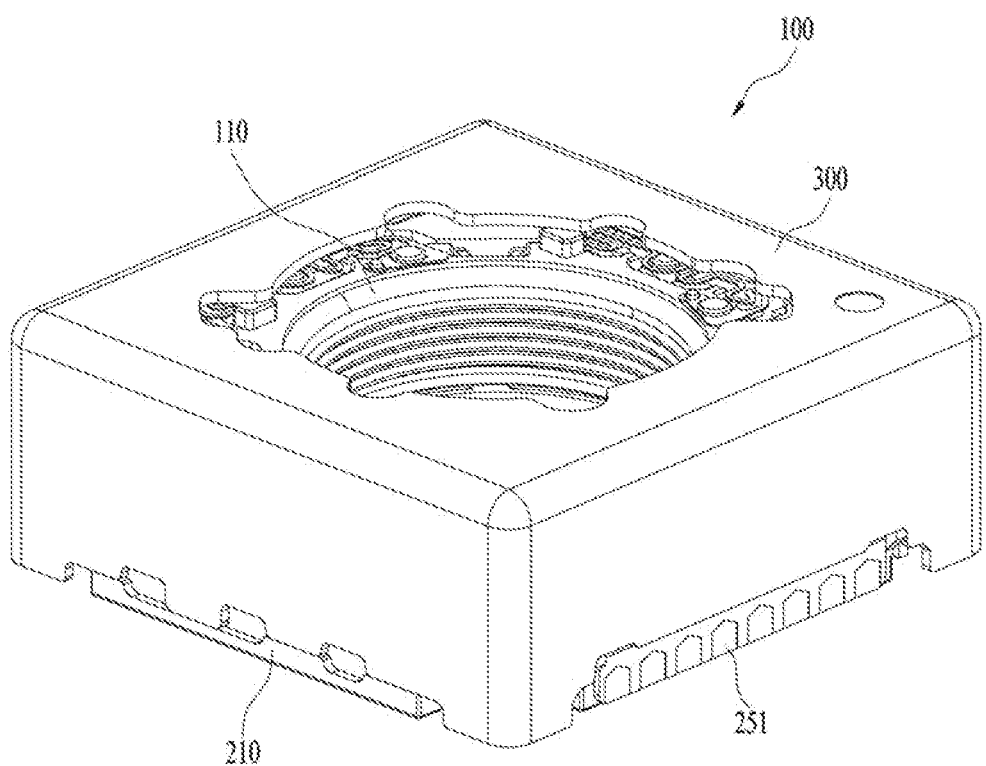
FIG. 1 is a perspective view of a lens moving apparatus according to an embodiment.

Hereinafter, embodiments will be clearly elucidated via description thereof with reference to the accompanying drawings. In the following description of the embodiments, it will be understood that, when an element such as a layer (film), region, pattern, or structure is referred to as being "on" or "under" another element, it can be "directly" on or under another element, or can be "indirectly" formed such that an intervening element may also be present. In addition, it will also be understood that the criteria for "on" or "under" are determined on the basis of the drawings.

In the drawings, the dimensions of layers may be exaggerated, omitted or illustrated schematically for clarity and convenience of description. In addition, the dimensions of constituent elements may not accurately reflect the actual dimensions. Wherever possible, the same reference numbers will be used throughout the drawings to refer to the same or like parts.

For the convenience of description, although the lens moving apparatus is described using a rectangular coordinate system (x, y, z), the lens moving apparatus may be described using some other coordinate systems, and the embodiments are not limited thereto. In the respective drawings, the X-axis and the Y-axis mean directions perpendicular to an optical axis, i.e. the Z-axis, and the optical axis (Z-axis) direction or a direction parallel to the optical axis may be referred to as a "first direction", the X-axis direction may be referred to as a "second direction", and the Y-axis direction may be referred to as a "third direction".

A "handshake correction device", which is applied to a subminiature camera module of a mobile device such as, for example, a smart phone or a tablet PC, may be a device that is configured to prevent the contour line of a captured image from being indistinctly formed due to vibration caused by shaking of the user's hand when capturing a still image.

In addition, an "auto-focusing device" is a device that automatically focuses an image of a subject on an image sensor surface. The handshake correction device and the auto-focusing device may be configured in various ways, and the lens moving apparatus according to an embodiment may move an optical module, which is constituted of at least one lens, in the first direction, which is parallel to the optical axis, or relative to a plane defined by the second and third directions, which are perpendicular to the first direction, thereby performing handshake correction motion and/or auto-focusing.

Figure 2:
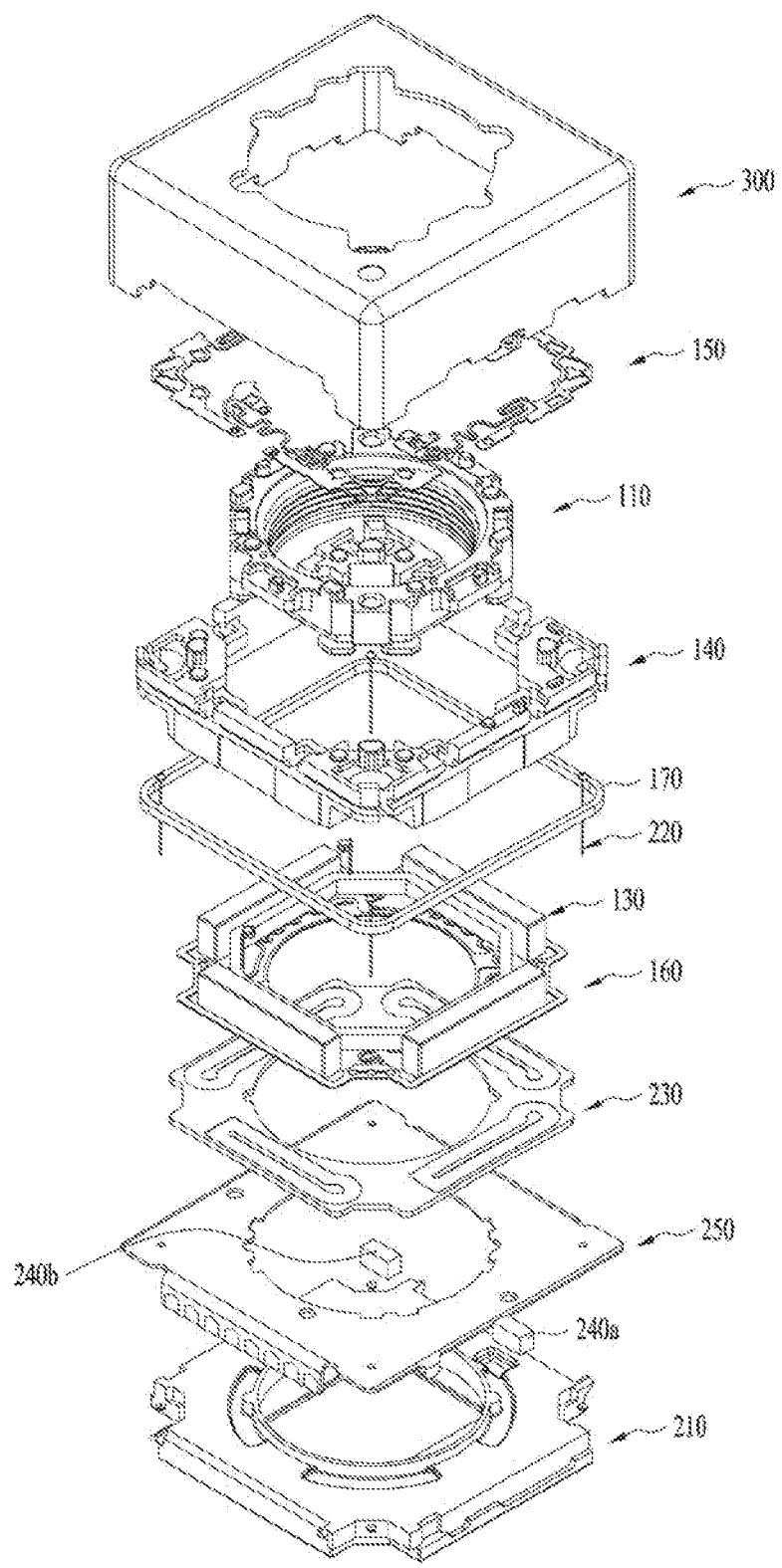
FIG. 2 is an exploded view of the lens moving apparatus shown in FIG. 1.
Figure 3:
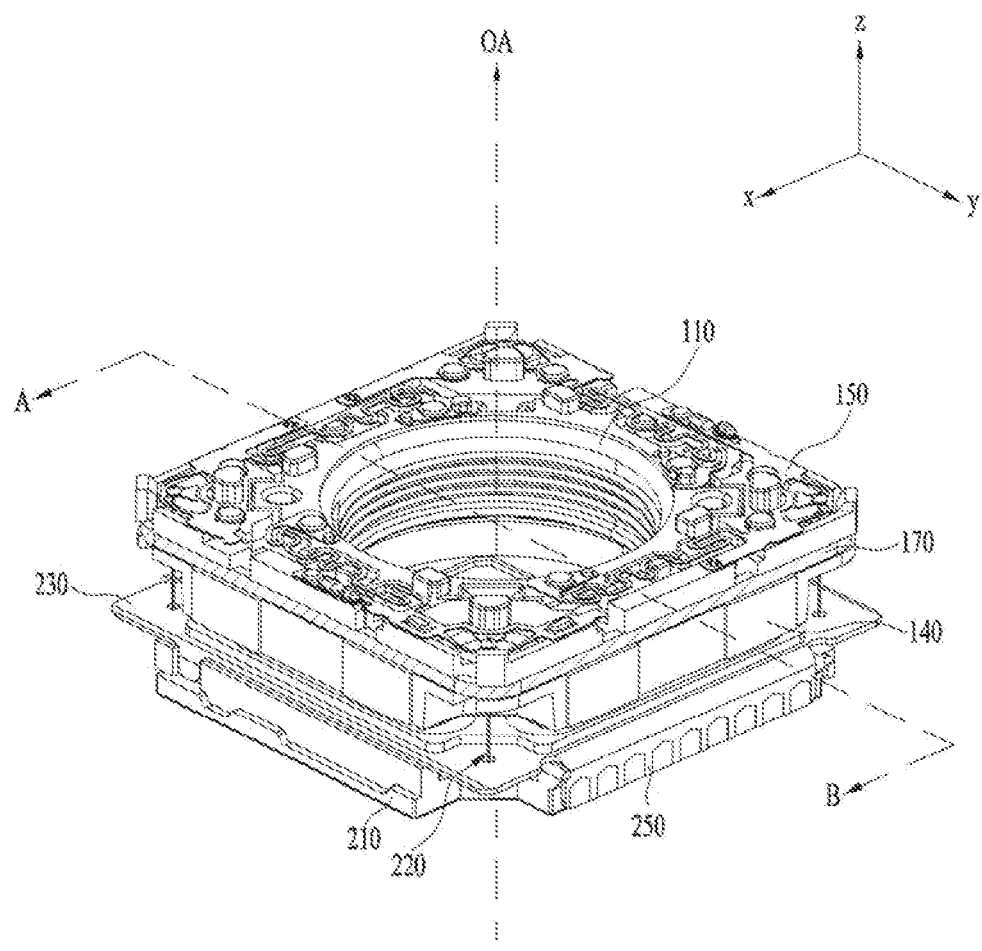
FIG. 3 is a view illustrating the assembled state of the lens moving apparatus shown in FIG. 1, from which a cover is removed.

FIG. 1 is a perspective view of a lens moving apparatus 100 according to an embodiment. FIG. 2 is an exploded view of the lens moving apparatus 100 shown in FIG. 1. FIG. 3 is a view illustrating the assembled state of the lens moving apparatus 100 shown in FIG. 1, from which a cover 300 is removed.

Referring to FIGS. 1 to 3, the lens moving apparatus 100 may include a bobbin 110, a first coil 120, magnets 130, a housing 140, an upper elastic member 150, a lower elastic member 160, and a second coil 170.

The lens moving apparatus 100 may further include a circuit board 250.

The lens moving apparatus 100 may further include support members 220.

The lens moving apparatus 100 may further include a third coil 230 and a position sensor 240. The lens moving apparatus 100 may further include a cover member 300 and a base 210.

The cover member 300 will be described.

The cover member 300 accommodates the components 110, 120, 130, 140, 150, 160, 170, 220 and 250, in the space defined between the cover member 300 and the base 210.

The cover member 300 may take the form of a box that has an open bottom and comprises a top plate and a side plate. The bottom of the cover member 300 may be coupled to the top of the base 210.

The cover member 300 may have an opening formed in the top plate thereof in order to expose a lens (not shown), coupled to the bobbin 110, to outside light.

Although the material of the cover member 300 may be a non-magnetic material such as, for example, SUS in order to prevent the cover member 300 from being attracted by the magnets 130, the cover member 300 may be formed of a magnetic material, and may thus function as a yoke for increasing electromagnetic force caused by interaction between the cover member 300 and the first coil 120.

Next, the bobbin 110 will be described.

The bobbin 110 may allow a lens or a lens barrel to be mounted thereon and may be disposed in the housing 140.

Figure 4A:
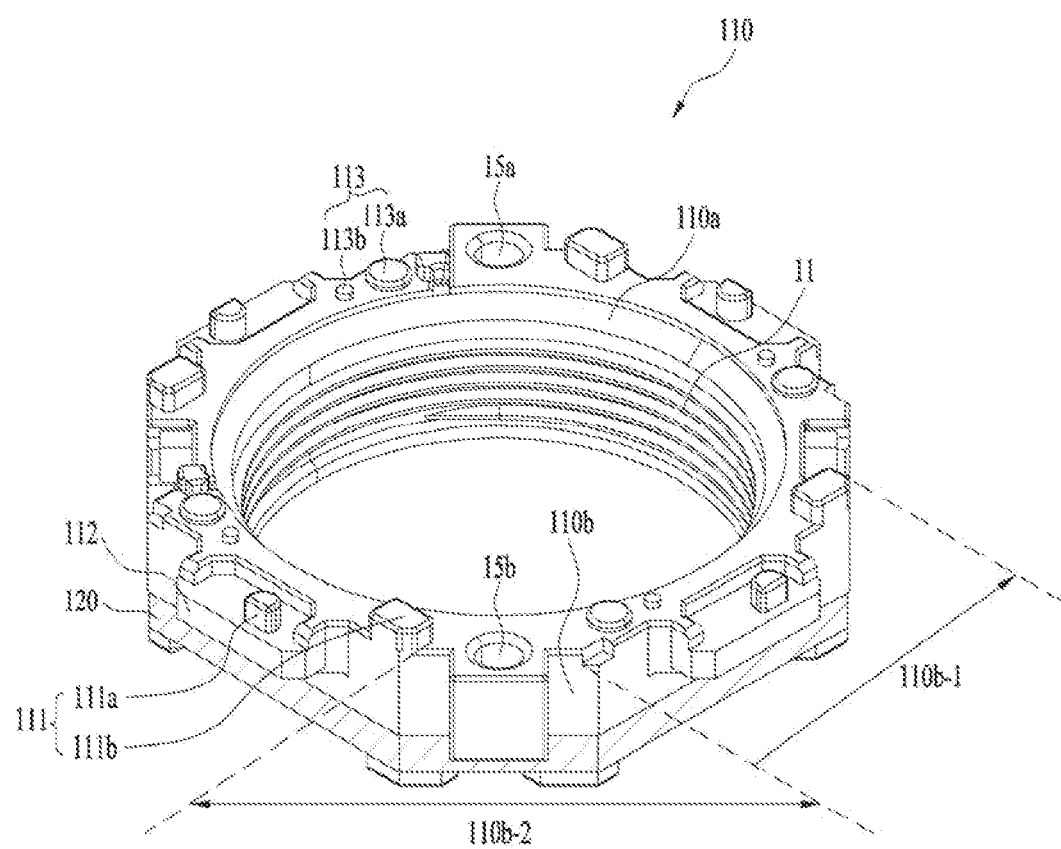
FIG. 4A is a first perspective view of a bobbin and the first coil shown in FIG. 1.
Figure 4B:
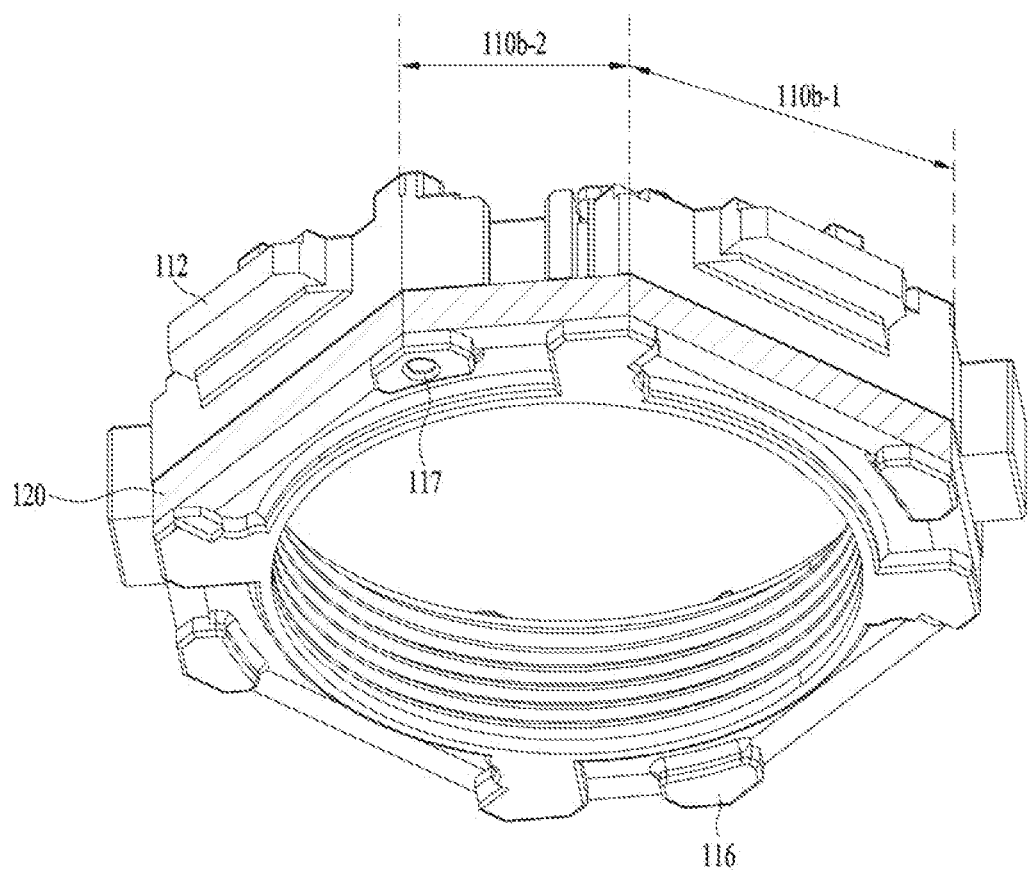
FIG. 4B is a second perspective view of the bobbin and the first coil shown in FIG. 1.

FIG. 4A is a first perspective view of the bobbin 110 and the first coil 120 shown in FIG. 1. FIG. 4B is a second perspective view of the bobbin 110 and the first coil 120 shown in FIG. 1.

Referring to FIGS. 4A and 4B, the bobbin 110 may include first projections 111, which project from the upper surface of the bobbin 110 in the first direction, and second projections 112, which project from the outer peripheral surface of the bobbin 110 in the second and/or third direction.

Each of the first projections 111 of the bobbin 110 may include a first guide portion 111a and a first stopper 111b. The first guide portion 111a of the bobbin 110 may serve to guide the positioning of the upper elastic member 150. For example, the first guide portion 111a of the bobbin 110 may guide a first frame-connecting portion 153 of the upper elastic member 150.

The second projections 112 of the bobbin 110 may project from the outer peripheral surface 110b of the bobbin 110 in the second and/or third direction. In order to avoid spatial interference with the first frame-connecting portions 153, the upper surfaces of the second projections 112 may be positioned lower than the upper surface of the bobbin 110. For example, each of the second projections 112 may be an escape groove, and the escape groove may have a shape that is depressed from the upper surface of the bobbin 110.

The bobbin 110 may include second stoppers 116, which project from the lower surface thereof.

The bobbin 110 may include side portions 110b-1, which correspond to or face the magnets 130, and side portions 110b-2 positioned between the side portions 110b-1.

The bobbin 110 may be provided in the outer peripheral surface thereof with a first coil groove (not shown), to which the first coil 120 is disposed or mounted. The number and shape of first coil grooves may correspond to the number or shape of the first coils 120 disposed on the outer peripheral surface 110b of the bobbin 110. In another embodiment, the bobbin 110 may not have the first coil groove, and the first coil 120 may be directly wound around the outer peripheral surface 110b of the bobbin 110 and may be secured thereto.

Furthermore, the bobbin 110 may be provided on the upper surface thereof with protrusions 113, which are fitted into holes 151a in first inner frames 151.

Each of the protrusions 113 may include a first upper protrusion 113a and a second upper protrusion 113b, which are disposed on the side portion 110b-1 so as to be spaced apart from each other.

The first upper protrusions 113a are intended to be fused to the first inner frames 151 of the upper elastic member 150, and the second upper protrusions 113b are intended to be conductively connected to the first inner frames 151 of the upper elastic member 150 via solder or conductive adhesive members. For example, the diameter of the first upper protrusion 113a may be larger than the diameter of the second upper protrusion 113b.

The bobbin 110 may be provided in the lower surface thereof with a first lower coupling groove 117, which is coupled or secured to a hole 161a in the lower elastic member 160. In another embodiment, for coupling with the hole 161a in the lower elastic member 160, the lower surface of the bobbin 110 may be provided with a support protrusion.

The bobbin 110 may be provided in the inner peripheral surface thereof with a threaded line 11 for engagement with a lens or a lens barrel. The threaded line 11 may be formed in the inner peripheral surface of the bobbin 110 in the state in which the bobbin 110 is held by means of a jig, and the upper surface of the bobbin 110 may have jig-holding grooves 15a and 15b formed therein. For example, the jig-holding grooves 15a and 15b may be provided in upper surfaces of side portions 110b-2 that are opposite each other, without being limited thereto.

Next, the first coil 120 will be described.

The first coil 120 may be a drive coil, which is disposed on the outer peripheral surface 110b of the bobbin 110 so as to perform electromagnetic interaction with the magnets 130 disposed on the housing 140.

In order to create electromagnetic force through interaction with the magnets 130, a drive signal (for example, drive current or voltage) may be applied to the first coil 120.

The drive signal applied to the first coil 120 may be an AC signal, for example, AC current. For example, the drive signal applied to the first coil 120 may be a sinusoidal wave or a pulse signal (for example, a pulse width modulation (PWM) signal).

In another embodiment, the drive signal that is applied to the first coil 120 may include an AC signal and a DC signal.

An AF movable unit or an AF mover may be moved in the first direction by virtue of electromagnetic force resulting from the interaction between the first coil 120 and the magnets 130. By controlling the intensity and/or polarity of a drive signal applied to the first coil 120 (for example, the direction in which current flows) and thus controlling the intensity and/or direction of electromagnetic force resulting from the interaction between the first coil 120 and the magnets 130, it is possible to control the movement of the AF movable unit in the first direction, thereby performing an autofocus function.

The AF movable unit or the mover may include the bobbin 110, which is elastically supported by the upper and lower elastic members 150 and 160, and components that are mounted on the bobbin 110 and are moved therewith. For example, the AF movable unit may include the bobbin 110, the first coil 120, and a lens (not shown) mounted on the bobbin 110.

The first coil 120 may be wound or disposed around the outer peripheral surface of the bobbin 110 in a clockwise or counterclockwise direction about the optical axis. In another embodiment, the first coil 120 may be embodied as a coil ring, which is wound or disposed in a clockwise or counterclockwise direction about an axis perpendicular to the optical axis. Although the number of coil rings may be equal to the number of magnets 130, the disclosure is not limited thereto.

The first coil 120 may be conductively connected to at least one of the upper elastic member 150 or the lower elastic member 160, and may be conductively connected to the circuit board 250 via the upper elastic member 150 or the lower elastic member 160 and the support members 220. For example, the first coil 120 may be conductively connected to third and fourth upper springs 150-3 and 150-4.

Next, the housing 140 will be described.

The housing 140 accommodates therein the bobbin 110, with the first coil 120 disposed thereon.

Figure 5A:
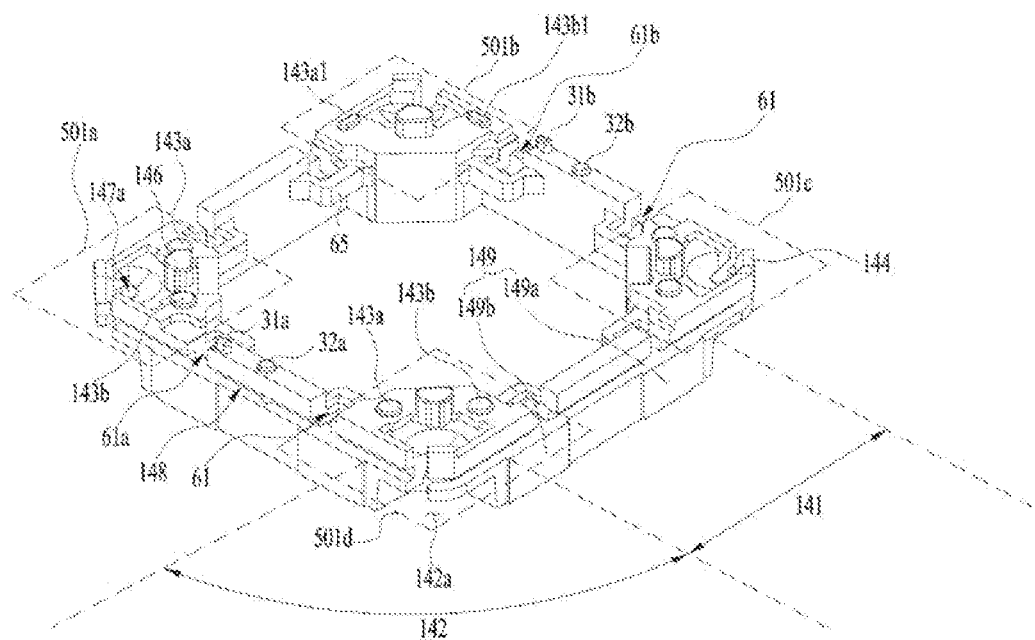
FIG. 5A is a first perspective view of a housing shown in FIG. 1.
Figure 5B:
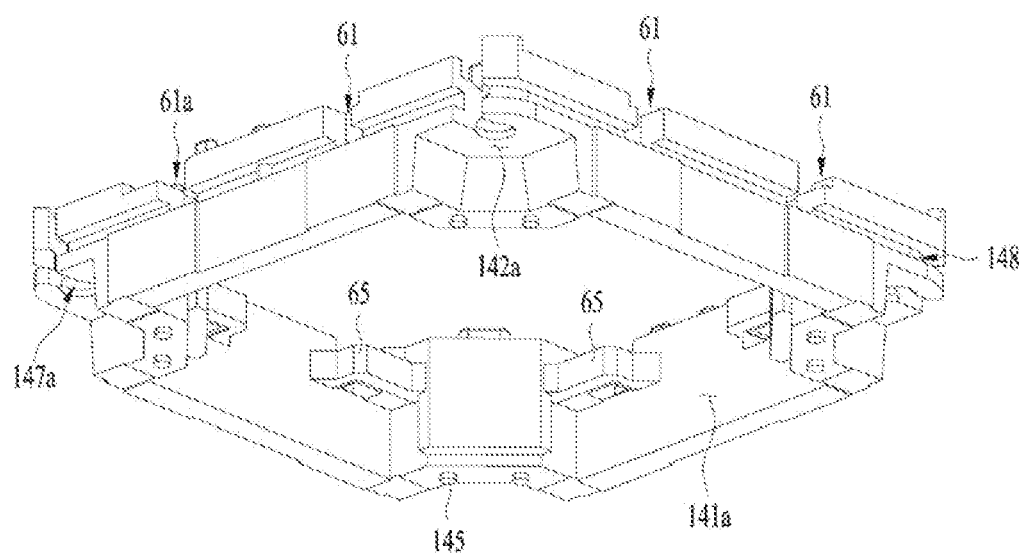
FIG. 5B is a second perspective view of the housing shown in FIG. 1.
Figure 6:
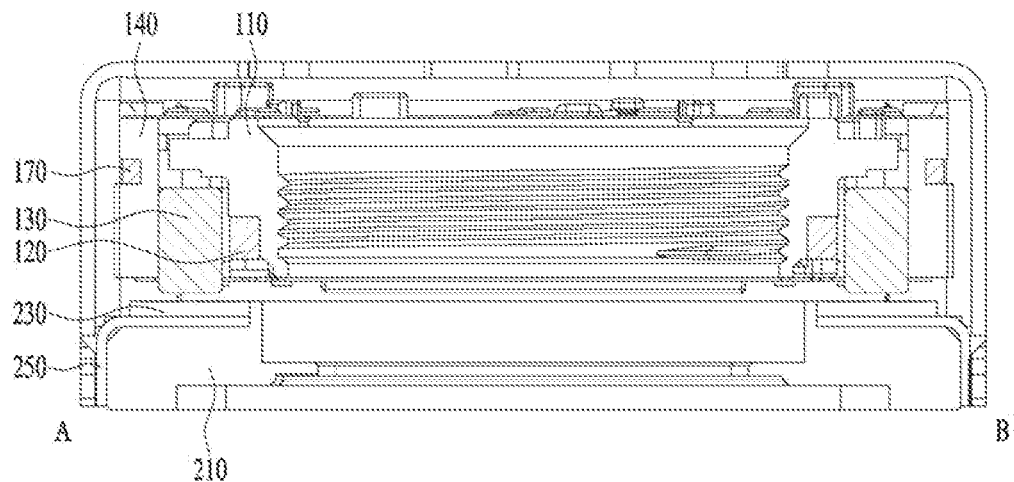
FIG. 6 is a cross-sectional view of the lens moving apparatus shown in FIG. 3, which is taken along line A-B in FIG. 3.

FIG. 5A is a first perspective view of the housing 140 shown in FIG. 1. FIG. 5B is a second perspective view of the housing 140 shown in FIG. 1. FIG. 6 is a cross-sectional view of the lens moving apparatus 110 shown in FIG. 3, which is taken along line A-B in FIG. 3.

Referring to FIGS. 5A, 5B and 6, the housing 140 may be configured to have the overall shape of a cylinder having an opening therein, and may include a plurality of side portions 141 and 142, which define the opening.

For example, the housing 140 may include the side portions 141, which are spaced apart from each other, and the side portions 142, which are spaced apart from each other. Each of the side portions 141 of the housing 140 may be disposed or positioned between two adjacent side portions 142 so as to connect the two adjacent side portions 142 to each other, and may include a flat surface having a predetermined depth.

Since the side portions 142 of the housing 140 correspond to the corner regions of the housing 140, the side portions 142 of the housing 140 may be represented as "corner portions".

As illustrated in FIG. 5A, for example, the housing 140 may include first to fourth side portions and first to fourth corner portions 501a to 501d.

The first side portion and the third side portion may face each other in the second direction, and the second side portion and the fourth side portion may face each other in the third direction.

The first corner portion 501a may be positioned between the first side portion and the second side portion of the housing 140, and the second corner portion 501b may be positioned between the second side portion and the third member of the housing 140. The third corner portion 501c may be positioned between the third side portion and the fourth side portion of the housing 140, and the fourth corner portion 501d may be positioned between the fourth side portion and the first side portion of the housing 140.

Although the side portion 141 of the housing 140 may correspond to or face the side portion 110b-1 of the bobbin 110 and the side portion 142 of the housing 140 may correspond to or face the side portion 110b-2 of the bobbin 110, the disclosure is not limited thereto.

The magnets 130; 130-1 to 130-4 may be disposed or mounted on the side portions 141 of the housing 140, and the support members 220 may be disposed on the side portions 142 of the housing 140.

In order to support or receive the magnets 130-1 to 130-4, the housing 140 may include magnet mounts 141a, which are provided on the inner surfaces of the side portions 141.

The housing 140 may be provided in the outer surface thereof with a first groove 148, in which the second coil 170 is wound or received.

For example, the first groove 148 in the housing 140 may be configured to have a shape that is depressed from the outer surfaces of the side portions 141 and the outer surfaces of the side portions 142 of the housing 140, and may be configured to have a ring shape, without being limited thereto.

For example, the first groove 148 in the housing 140 may be provided in the upper ends of the outer surfaces of the side portions 141 and the upper ends of the outer surfaces of the side portions 142 of the housing 140.

For example, the first groove 148 in the housing 140 may be spaced apart from the upper surface of the housing 140, and may be provided above the magnets 130-1 to 130-4 disposed on the housing 140.

At least one of the side portions 141 of the housing 140 may have grooves 61a, 61b and 61 formed therein.

For example, the second groove 61a may be formed in the first side portion of the housing 140, and a third portion 17c of the second coil 170 may be disposed in the second groove 61a. The third groove 61b may be formed in the third side portion of the housing 140, and a fifth portion 17e of the second coil 170 may be disposed in the third groove 61b.

For example, the groove 61 may be formed in each of the first to fourth side portions of the housing 140.

For example, each of the grooves 61a, 61b and 61 may be a slot, which is formed through the side portion 141 of the housing 140 and is open at the upper surface thereof.

Although two grooves 61a, 61b and 61, which are spaced apart from each other, are provided in each of the side portions 141 of the housing 140 in FIG. 5A, the disclosure is not limited thereto.

Each of the grooves 61a, 61b and 61 may be connected to the first groove 148 and may be positioned above the first groove 148.

For example, the second groove 61a may be disposed between a protrusion 143b disposed on the first corner portion 501a and a projection 31a disposed on the first side portion of the housing 140 adjacent to the first corner portion 501a.

For example, the third groove 61b may be disposed between a protrusion 143b1 disposed on the second corner portion 501b and a projection 31b disposed on the third side portion of the housing adjacent to the second corner portion 501b.

The grooves 61 may be positioned between a protrusion 32b disposed on the third side portion of the housing 140 and a protrusion 143b disposed on the third corner portion 501c and between a protrusion 32a disposed on the first side portion of the housing 140 and a protrusion 143a disposed on the fourth corner portion 501d.

For example, the grooves 61a, 61b and 61 may be positioned above the first groove 148, in which a first portion 17a of the second coil 170 is disposed, and may be provided at the lower ends thereof with openings communicating with the first groove 148.

The first and second grooves 61a and 61b in the housing 140 may serve as paths through which a portion or another portion of the second coil 170 extends, and the grooves 61a, 61b and 61 in the housing 140 may serve as injection ports through which adhesive for attaching the magnets 130 to the housing 140 is injected.

The housing 140 may include guide projections 65 disposed on the inner surface thereof so as to guide the adhesive injected into the grooves 61a, 61b and 61. The guide projections 65 may serve to block the introduction of the adhesive into the housing 140.

The side portions 141 of the housing 140 may be disposed parallel to the side plate of the cover member 300. The side portions 142 of the housing 140 may be provided with holes 147a through which the support members 220 extend. Each of the holes 147a may be configured such that the diameter thereof is gradually increased moving toward the lower surface from the upper surface of the housing 140. The reason for this is to allow a damper, which will be described later, to be easily disposed in the hole 147a.

Furthermore, the housing 140 may be provided on the upper surface thereof with second stoppers 144 so as to prevent the housing 140 from directly colliding with the inner surface of the cover member 300. For example, although the second stoppers 144 may be respectively disposed on the first to fourth corner portions 501a to 501d of the housing 140, the disclosure is not limited thereto.

In order to guide positioning of first outer frames 152 of the upper elastic member 150 when the upper elastic member 150 is placed on the upper surface of the housing 140, the housing 140 may be provided on the upper surface thereof with second guide portions 146.

The second guide portions 146 may be disposed on the corner portions 501a to 501d of the housing 140 so as to be respectively spaced apart from the second stoppers 144. For example, each of the second guide portions 146 may face a corresponding one of the second stoppers 144 in a diagonal direction. Here the diagonal direction may be the direction toward the second stopper 144 from the center of the housing 140. Furthermore, the second guide portions 146 may also serve as stoppers for preventing the upper surface of the housing 140 from directly colliding with the inner surface of the cover member 300.

The housing 140 may include one or more first protrusions 143a, 143b, 143a1 and 143b1, which are provided on the upper surfaces of the side portions 142 for coupling into holes 152a1 and 152a2 in the first outer frame 152 of the upper elastic member 150.

The first protrusions 143a, 143b, 143a1 and 143b1 may be disposed on at least one of the upper surfaces of the first to fourth corner portions 501a to 501d of the housing 140.

For example, the housing 140 may include first protrusions 143a and 143a1, which are disposed at one side of the second guide portion 146, and first protrusions 143b and 143b1, which are disposed at the other side of the second guide portion 146.

For example, although the first protrusions 143a and 143b may be configured to have the same shape, the disclosure is not limited thereto. Each of the one or more first protrusions 143a1 and 143b1 may be configured to each have a shape different from the shape of a corresponding one of the first protrusions 143a and 143b.

Furthermore, the housing 140 may include one or more second protrusions 32a and 32b disposed on the upper surfaces of the side portions 142 for coupling with the holes 26 in the first outer frames 152 of the upper elastic member 150.

For example, although the second protrusions 32a and 32b may be disposed on the upper surfaces of two side portions 141 that face each other, among the side portions 141 of the housing 140, the disclosure is not limited thereto.

For example, the second protrusion 32a may be positioned at the upper surface of one of the side portions 141, for example, the first side portion 141 of the housing 140 adjacent to the first corner portion 501a. The second protrusion 32b may be positioned at the upper surface of another one of the side portions 141, for example, the third side portion of the housing 140 adjacent to the second corner portion 501b.

For example, the second protrusions 32a and 32b may be positioned at two side portions 141 of the housing 140 that face each other in the second or third direction.

Furthermore, the housing 140 may include projections 31a and 31b, which are provided on the upper surfaces of the side portions 141 of the housing 140 so as to stably hold a portion (for example, a starting portion) and another portion (for example, an ending portion) of the second coil 170.

The projections 31a and 31b may be disposed on the upper surfaces of two side portions that face each other, among the side portions 141 of the housing 140, for example, on the upper surfaces of the first side portion and the third side portion of the housing 140. The projections 31a and 31b may be disposed on the first and third side portions of the housing 140, at which the second protrusions 32a and 32b are positioned.

For example, the first projection 31a may be disposed between the first protrusion 143b disposed on the first corner portion 501a and the second protrusion 32a disposed on the upper surface of the first side portion of the housing 140 adjacent to the first corner portion 501a.

The second projection 31b may be disposed between the first protrusion 143b1 disposed on the corner portion 501b and the second protrusion 32b disposed on the upper surface of the third side portion of the housing 140 adjacent to the second corner portion 501b.

The first groove 61a may be positioned between the first protrusion 143b disposed on the first corner portion 501a and the first projection 31a disposed on the first side portion of the housing 140 adjacent to the first corner portion 501a, and the second groove 61b may be positioned between the second protrusion 143b1 disposed on the second corner portion 501b of the housing 140 and the second projection 31b disposed on the third side portion of the housing 140 adjacent to the second corner portion 501b.

Since the first and second grooves 61a and 61b are respectively positioned adjacent to the first and second projections 31a and 31b, a portion and another portion of the second coil 170 may be easily wound around the first and second projections 31a and 31b, respectively.

The housing 140 may include one or more protrusions 145 disposed on the lower surfaces of the side portions of the housing 140 so as to be coupled or secured to holes 162a in second outer frames 162 of the lower elastic member 160. Although the protrusions 145 may be disposed on at least one of the first to fourth corner portions 501a to 501d of the housing 140, the disclosure is not limited thereto.

In order to ensure not only paths through which the support members 220 extend but also spaces that are filled with silicone for damping, the housing 140 may have recesses 142a formed in the lower portions of the side portions 142. The recesses 142a in the housing 140 may be filled with, for example, damping silicone.

The housing 140 may have third stoppers 149, which project from the outer surfaces of the side portions 141 in the second or third direction. Although the housing 140 is illustrated in FIG. 5A as having two third stoppers 149a and 149b on each of the outer surfaces of the side portions 141, the disclosure is not limited thereto.

The third stoppers 149 are intended to prevent the housing 140 from colliding with the inner surfaces of the side portions of the cover member 300 when the housing 140 moves in the second and third directions.

In order to prevent the bottom surface of the housing 140 from colliding with the base 210, the third coil 230 and/or the circuit board 250, which will be described later, the housing 140 may further include a fourth stopper (not shown) projecting from the lower surface thereof.

Next, the magnets 130; 130-1 to 130-4 will be described.

Although the magnets 130-1 to 130-4 are disposed in the side portions 141 of the housing 140, the disclosure is not limited thereto. In another embodiment, the magnets 130-1 to 130-4 may be disposed outside the side portions 141 of the housing 140.

The magnets 130 may be disposed on the side portions 141 of the housing 140 so as to correspond to or be aligned with the first coil 120 in a direction perpendicular to the optical axis at the initial position of the bobbin 110.

For example, the magnets 130-1 to 130-4 disposed on the housing 130 may overlap the first coil 120 in the second or third direction at the initial position of the bobbin 110.

Here, the initial position of the bobbin 110 may be the initial position of the AF movable unit in the state in which power is not applied to the first coil 120, and may be the position of the AF movable unit when the upper elastic member 150 and the lower elastic member 160 are elastically deformed by only the weight of AF movable unit.

Furthermore, the initial position of the bobbin 110 may be the position of the AF movable unit when gravity is applied toward the base 210 from the bobbin 110 or toward the bobbin 110 from the base 210. The AF movable unit may include the bobbin 110 and components mounted on the bobbin 110, for example, the first coil 120.

In another embodiment, the magnet mounts 141a may not be provided in the side portions of the housing 140, and the magnets 130 may be disposed inside or outside the side portions of the housing 140.

Although each of the magnets 130 may have a shape that corresponds to a corresponding one of the side portions of the housing 140, for example, a rectangular parallelepiped shape, the disclosure is not limited thereto.

Although each of the magnets 130 may be a monopole-magnetized magnet which is constructed such that a surface thereof that faces the first coil 120 is an S pole and the opposite second surface thereof is an N pole or a bipole-magnetized magnet, the disclosure is not limited thereto, and the reverse disposition is also possible.

Although the number of magnets 130 is four in the embodiment, the disclosure is not limited thereto, and the number of magnets 130 may be at least two. Although each of the surfaces of the magnets 130 that faces the coil 120, may be a flat surface, the disclosure is not limited thereto, and the surface may be a curved surface.

Next, the upper elastic member 150 and the lower elastic member 160 will be described.

Each of the upper elastic member 150 and the lower elastic member 160 is coupled both to the bobbin 110 and to the housing 140 so as to elastically support the bobbin 110. In the upper elastic member 150 and/or the lower elastic member 160, the term "elastic member" may be replaced with the term "elastic unit".

For example, the upper elastic member 150 may be coupled both to the upper portion, the upper surface or the upper end of the bobbin 110 and to the upper portion, the upper surface or the upper end of the housing 140, and the lower elastic member 160 may be coupled both to the lower portion, the lower surface or the lower end of the bobbin 110 and to the lower portion, the lower surface or the lower end of the housing 140.

Figure 7:
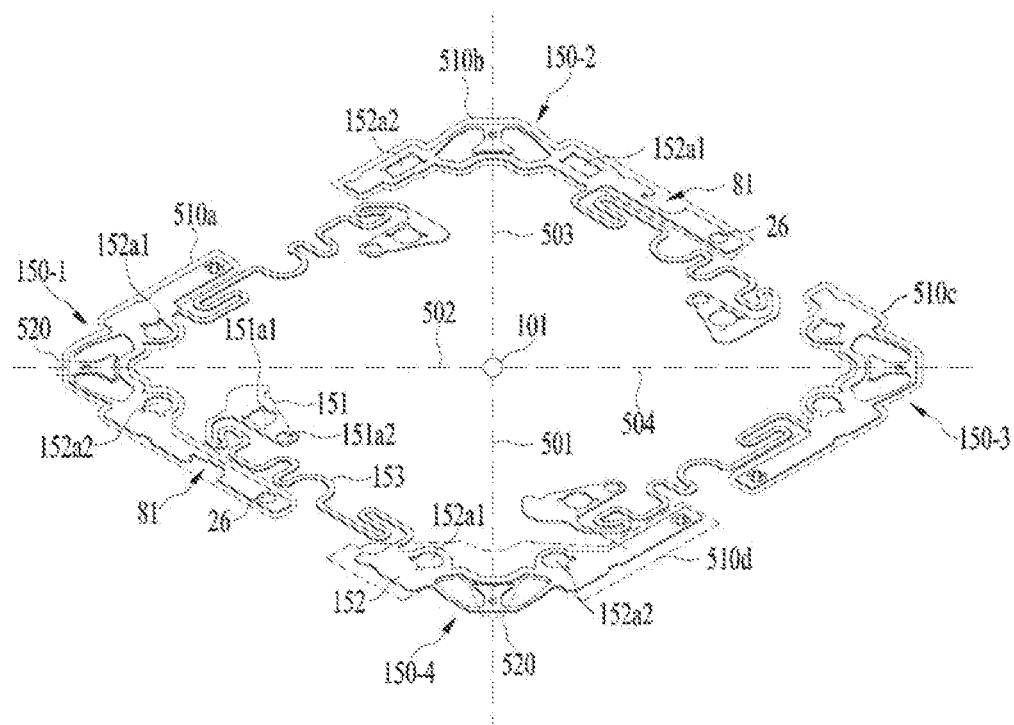
FIG. 7 is a perspective view of an upper elastic member shown in FIG. 2.
Figure 8:
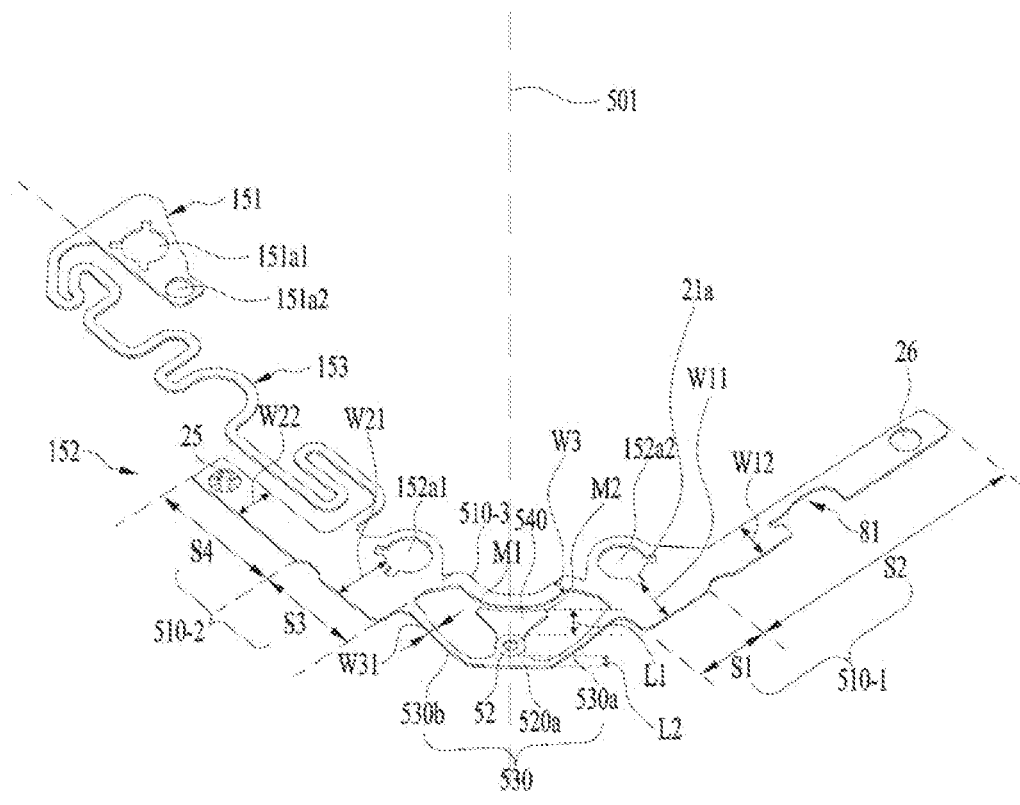
FIG. 8 is an enlarged view of a first outer frame of a first upper spring shown in FIG. 7.
Figure 9:
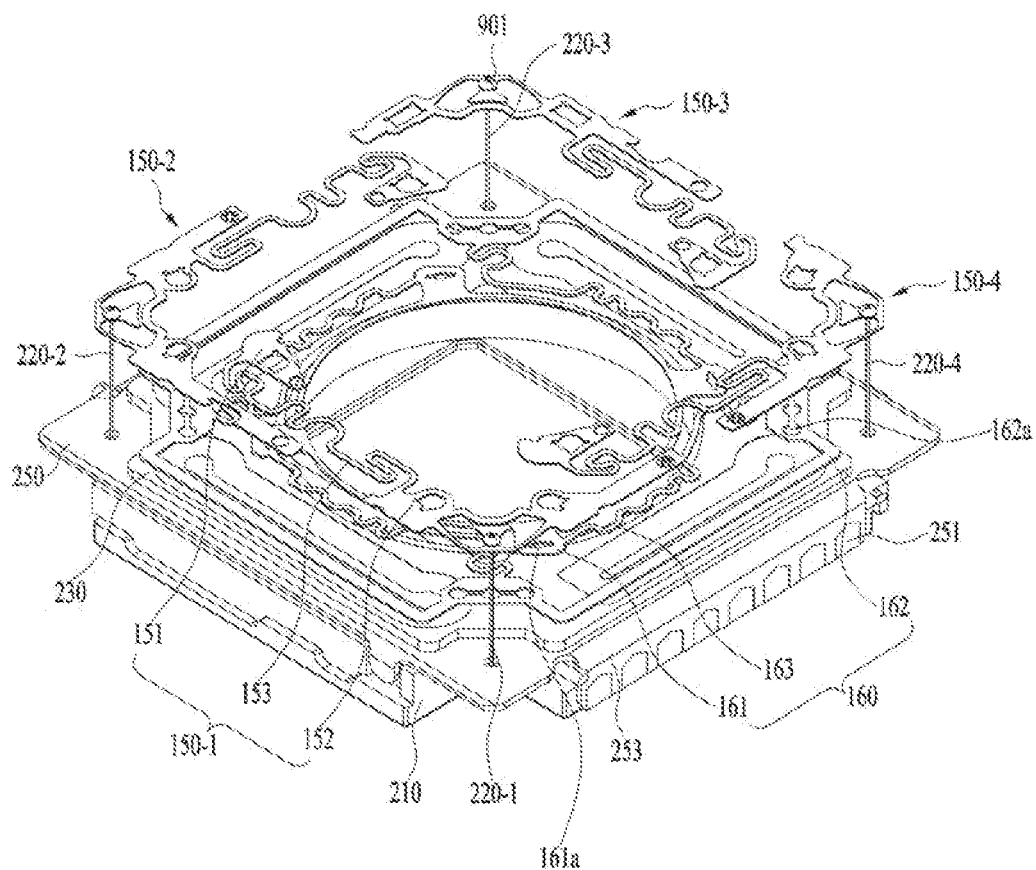
FIG. 9 is an assembled perspective view of the upper elastic member, a lower elastic member, a third coil, a circuit board and the base, which are shown in FIG. 2.
Figure 10:
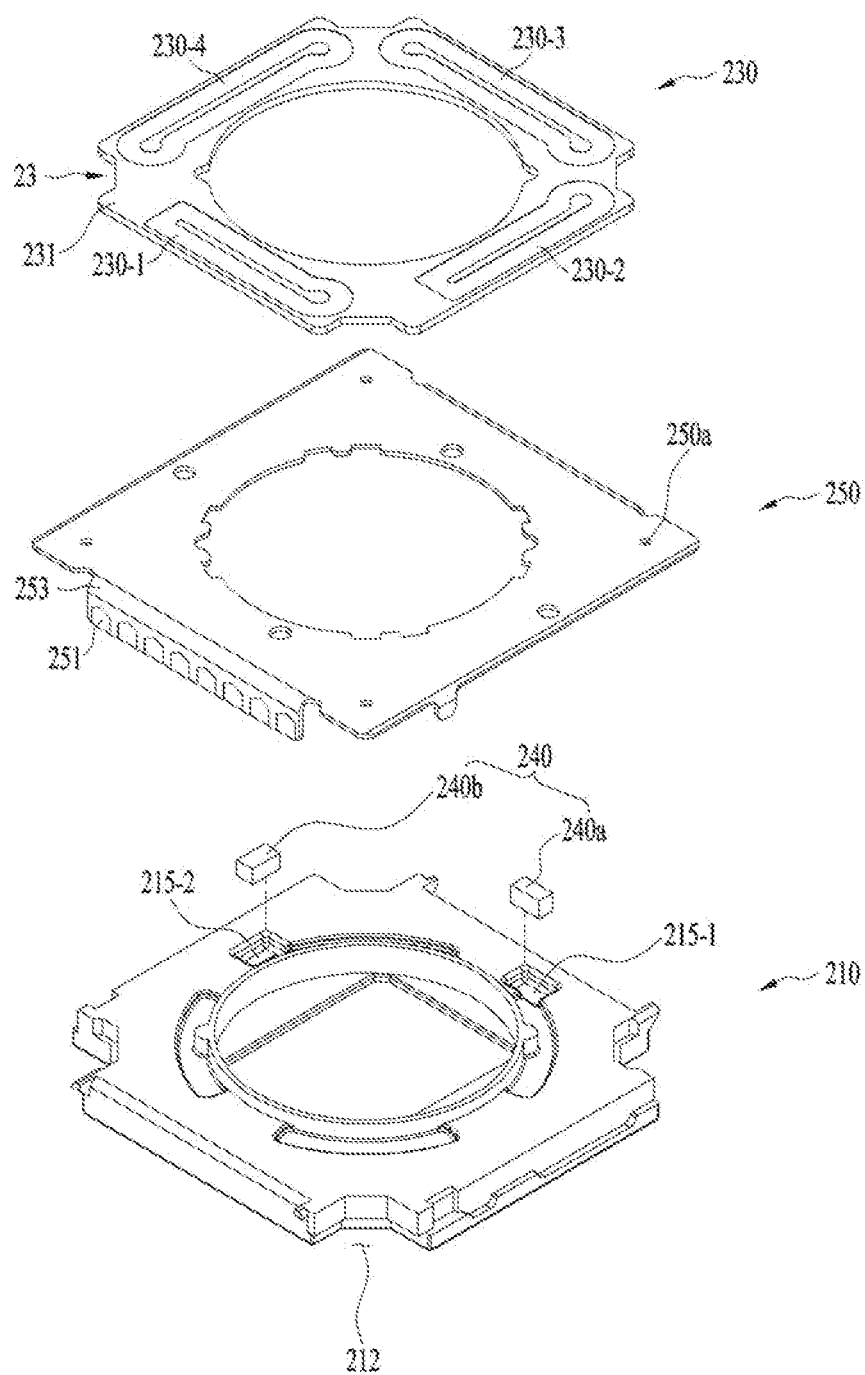
FIG. 10 is an exploded perspective view of the third coil, the circuit board, the base, first and second position sensors and an amplifier.

FIG. 7 is a perspective view of the upper elastic member 150 shown in FIG. 2. FIG. 8 is an enlarged view of a first outer frame 152 of a first upper spring 150-1 shown in FIG. 7. FIG. 9 is an assembled perspective view of the upper elastic member 150, the lower elastic member 160, the third coil 230, the circuit board 250 and the base 210, which are shown in FIG. 2. FIG. 10 is an exploded perspective view of the third coil 230, the circuit board 250, the base 210, first and second position sensors 240a and 240b, and an amplifier 310.

Referring to FIGS. 7 to 10, at least one of the upper and lower elastic members 150 and 160 may be divided or separated into two or more.

For example, the upper elastic member 150 may include first to fourth upper springs 150-1 to 150-4, which are spaced apart from one another. Here, the term "upper spring" may be replaced with the term "spring".

Although each of the upper elastic member 150 and the lower elastic member 160 may be embodied as a leaf spring, the disclosure is not limited thereto. Each of the upper and lower elastic members 150 and 160 may be embodied as a coil spring, a suspension wire or the like.

Each of the first to fourth upper springs 150-1 to 150-4 may include a first inner frame 151 coupled to the upper portion, the upper surface or the upper end of the bobbin 110, a first outer frame 152 coupled to the upper portion, the upper surface or the upper end of the housing 140, and a first frame-connecting portion 153 connecting the first inner frame 151 to the first outer frame 152.

The first frame-connecting portion 153 may connect the first outer frame 152, for example, a third coupling portion 510-2, to the inner frame.

Each of the first and second frame-connecting portions 153 and 163 of the upper and lower elastic members 150 and 160 may be bent or curved (or rounded) at least once or more so as to form a pattern having a predetermined shape. The upward and/or downward movement of the bobbin 110 in the first direction may be elastically (flexibly) supported through positional variation and fine deformation of the first and second frame-connecting portions 153 and 163.

The first outer frame 152 of each of the first to fourth upper springs 150-1 to 150-4 may include an outer portion 510 coupled to the housing 140, a first coupling portion 520 coupled to a corresponding one of the support members 220-1 to 220-4, and a first connecting portion 530 connecting outer portions 510a to 510d to the first coupling portion 520.

The first coupling portion 520 may include a first extension 540, which extends toward the outer portions 510a to 510d from the first coupling portion 520.

Each of the outer portions 510a to 510d may be disposed on the corner portion and at least one side portion 141 of the housing 140 adjacent to the corner portion.

For example, each of the outer portions 510a to 510d may be coupled to the corner portion of the housing 140 and to at least one side portion of the housing 140 adjacent to the corner portion or the other side portion of the housing 140 adjacent to the corner portion.

For example, the first outer portion 510a may include a second coupling portion 510-a, which is disposed on the first side portion of the housing 140 and is coupled to the housing 140, a third coupling portion 510-2, which is disposed on the second side portion adjacent to the first side portion of the housing 140 and is coupled to the housing 140, and a second connecting portion 510-3 connecting the second coupling portion 510-1 to the third coupling portion 510-2.

At least one first outer frame of the first to fourth upper springs 150-1 to 150-4 may include an outer portion, which is not disposed on the corner portion but is disposed on the side portion of the housing 140, a first coupling portion and a connecting portion connecting the first coupling portion to the outer portion. Here, the outer portion may not be coupled to the corner portion of the housing, but may be coupled to the side portion of the housing adjacent to the corner portion.

The first connecting portion 530 may include a third connecting portion 530a connecting the second coupling portion 510-1 to the first coupling portion 520, and a fourth connecting portion 530b connecting the third coupling portion 510-2 to the first coupling portion 520.

The first extension 540 may be spaced apart from the outer portion 510a. The first extension 540 may include a portion, which is increased in width moving toward the outer portion 510a from the first coupling portion 520. For example, the first extension 540 may include a portion, which is increased in width moving toward the center of the upper springs 150-1 to 150-4 from the first coupling portion 520.

For example, the portion of the first extension 540 that is increased in width may be configured to have a sector shape. The central angle (θ, see FIG. 13) of the sector-shaped first extension 540 about a coupling region 520a may be in the range of 40-160 degrees. If the central angle (θ, see FIG. 13) of the first extension 540 is smaller than 40 degrees, an effect of improving solderability may be decreased. Meanwhile, if the central angle of the first extension 540 is larger than 160 degrees, there may be spatial interference with the first connecting portion 530.

The portion of the first extension 540 that corresponds to the outer portion 510a may have a shape corresponding to the shape of the outer portion 510a.

The first extension 540 may be spaced apart both from the third connecting portion 530a and from the fourth connecting portion 530b.

The first extension 540 may include a second extension, which extends to the second coupling portion 510-1 from the first coupling portion 520, a third extension, which extends to the third coupling portion 510-2 from the first coupling portion 520, and a fourth extension, which extends to the second connecting portion 510-3 from the first coupling portion 520.

A damping member 91 may connect the first extension 540 to the outer portion 510a. The damping member 91 may be disposed between the first extension 540 and the second connecting portion 510-3.

The second coupling portion 510-1 may have therein a hole 152a2, which is coupled to the second protrusion 143b of the housing 140, and the third coupling portion 510-2 may have therein a hole 152a1, which is coupled to the second protrusion 143a of the housing 140.

The second coupling portion 510-1 may be positioned at one side of a reference line (for example, 501), and the third coupling portion 510-2 may be positioned at the other side of the reference line (for example, 501).

Although each of the second coupling portion 510-1 and the third coupling portion 510-2 is embodied as having through holes 152a1, 152a2, 25 and 26 in the embodiment shown in FIGS. 7 and 8, the disclosure is not limited thereto. In another embodiment, the second and third coupling portions may also be embodied as having various shapes suitable for being coupled to the housing 140, for example, grooves or the like.

Each of the holes 152a1 and 152a2 may have at least one slit 21a for allowing an adhesive member to be introduced into the clearance between the protrusions 143a and 143b and the holes 152a1 and 152a2.

The second coupling portion 510-1 may include the holes 152a2 and 26, which are positioned at the first corner portion 501a and a first side portion of the housing adjacent to the first corner portion 501a, and a groove 81, which is positioned between the holes 152a2 and 26.

The second coupling portion 510-1 may include a first zone S1, which is disposed on the first corner portion 501a and in which the hole 152a2 is positioned, and a second zone S2, which is connected to the first zone S1 and which extends to the upper surface of the first side portion of the housing 140 adjacent to the first corner portion 501a and is disposed thereon.

In another embodiment, the second coupling portion may be disposed at at least one of the first corner portion and one side portion of the housing 140 adjacent to the first corner portion, and may be coupled to at least one of the first corner portion and one side portion of the housing 140 adjacent to the first corner portion.

The second zone S2 may be provided with the groove 81, in which the projection 31a of the housing 140 is fitted, and one end of the second zone S2 may be provided with the hole 26, to which the second projection 32a of the housing 140 is coupled.

The first protrusion 143b of the first corner portion 501a of the housing 140 and the hole 152a2 in the second coupling portion 510-1 may be fused to each other, and the second protrusion 32a of the housing 140 and the hole 26 in the second coupling portion 510-1 may be fused to each other. The fusion coupling may mean that the second protrusion 32a is bonded to the upper spring by heat.

Since the protrusions 143b and 32a positioned at both sides of the first projection 31a of the housing 140 is fused to the outer portion of the first upper spring 150-1 of the upper spring 150, the embodiment is able to stably secure the first outer portion 510a of the first upper spring 150-1 to the housing 140 and to stably couple one end of the second coil 170 to the first outer portion 510a of the first upper spring 150-1. Accordingly, the embodiment is able to prevent disconnection of or damage to the second coil 170 caused by external impact.

The third coupling portion 510-2 may have one or more holes 152a1 and 25, which are positioned at at least one of the first corner portion 501a and the other side portion of the housing 140 adjacent to the first corner 501a.

The third coupling portion 510-2 may include a third zone S3, which is disposed on the first corner portion 501a and in which the hole 152a1 is disposed, and a fourth zone S4, which is connected to the third zone S3 and which extends to the upper surface of the other side portion of the housing 140 adjacent to the first corner portion 501a and is disposed thereon.

One end of the fourth zone S4 may be provided with the hole 25 so as to be coupled to the housing 140 via an adhesive member. Although the hole 25 has a crisscross shape in FIG. 8, the disclosure is not limited to that shape, and the hole may have, for example, a circular shape, an elliptical shape or a polygonal shape.

In another embodiment, the third coupling portion may be disposed on at least one of the first corner portion and the other side portion of the housing 140 adjacent to the first corner portion, and may be coupled to at least one of the first corner portion and the other side portion of the housing 140 adjacent to the first corner portion.

The second connecting portion 510-3 may connect the second coupling portion 510-1 to the third coupling portion 510-2.

For example, the second connecting portion 510-3 may connect the first zone S1 of the second coupling portion 510-1 to the third zone S3 of the third coupling portion 150-2, and the mounting position of the second connecting portion 510-3 may be guided by the second guide 146 of the housing 140.

Although the second connecting portion 510-3 may be configured to be convex toward the first corner portion 501a of the housing 140 from a central point 101, the disclosure is not limited thereto. The second connecting portion 510-3 may be configured to be convex the central point of the housing 140 from the corner portion 501b of the housing 140.

The first coupling portion 520 may have a hole 52 through which the support member 220 extends. One end of the support member 220 that has passed through the hole 52 may be coupled to the first coupling portion 520 via a conductive adhesive member or a solder 901, and the first coupling portion 520 may be conductively connected to the support member 220.

The first coupling portion 520 may include a coupling region 520a, which is coupled to the support member 220 via the solder 901, and the coupling region 520a may include the hole 52 and a region around the hole 520 on which the solder is disposed.

The first connecting portion 530 may connect at least one of the second coupling portion 510-1 and the third coupling portion 510-2 to the first coupling portion 520.

For example, the first connecting portion 530 may include the third connecting portion 530a, connecting the first zone S1 of the second coupling portion 510-1 to the first coupling portion 520, and the fourth connecting portion 530b, connecting the third zone S3 of the third coupling portion 510-2 to the first coupling portion 520.

Although each of the third connecting portion 530a and the fourth connecting portion 530b may include a bent portion, which is bent at least once, or a curved portion, which is curved at least once, the disclosure is not limited thereto. In another embodiment, the third connecting portion 530a and the fourth connecting portion 530b may be linear.

The width W31 of the third connecting portion 530a or the fourth connecting portion 530b of the first connecting portion 530, which is bent at least once, may be smaller than a first width W11 or W12 of the second coupling portion 510-1, a second width W21 or W22 of the third coupling portion 510-2 or a third width W1 of the second connecting portion 510-3.

For example, the first width W11 or W12 may be the minimal width along the entire region of the second coupling portion 510-1, the second width W21 or W22 may be the minimal width along the entire region of the third coupling portion 510-2, and the third width W3 may be the minimal width along the entire region of the second connecting portion 510-13.

Since the relationships between the widths are W31<W12, W31<W22 and W31<W3, the first connecting portion 530 may be easily movable in the first direction, whereby it is possible to distribute the stress applied to the upper elastic member 150 and the stress applied to the support member 220.

The first extension 540 may extend by a predetermined length L1 in a direction toward the outer portion 510a from the coupling region 520a of the first coupling portion 520 (hereinafter, referred to as an "extension direction").

The predetermined length L1 may be, for example, 0.1 mm-2 mm. If the length L1 is smaller than 0.1 mm, the effect of heat radiation and solderability may be deteriorated due to the decreased surface area of the first extension 540. Meanwhile, if the length L1 is greater than 2 mm, there may be spatial interference with the first connecting portion 530 and the outer portion.

In order to sufficiently ensure improvement of solderability and elimination of interference with the first connecting portion 530 and the outer portion, the length L1 may be within a range of 0.2 mm-1.2 mm.

For example, the extension direction may be a direction toward at least one of the second coupling portion 510-1, the third coupling portion 510-2 and the second connecting portion 510-3 of the outer portion 510a from the coupling region 520a of the first coupling portion 520.

The length L1 of the first coupling portion 520 may be larger than the length L2 of the coupling 520. The length L1 may be a distance between the coupling region 520a and one end of the first coupling portion 520 that extends in the extension direction of the first extension 540. The second length L2 may be a distance between the coupling region 520a and the other end of the first coupling portion 520 that extends in a direction opposite the extension direction of the first extension 540.

The length L1 of the first extension 540 may be larger than the distance L2 between the coupling region 520a of the first coupling portion 520 and the end of the first coupling portion 520 in a direction opposite the extension direction (L1>L2).

The area of the upper surface of the first extension 540 may be larger than the area of the upper surface of the first coupling portion 520.

The first extension 540 may serve to increase the surface area through which heat is transmitted to the first coupling portion 520 and to improve solderability when the first coupling portion 520 is soldered to the support member 220.

The first extension 540 may be spaced apart from the outer portion 510a and the first connecting portion 530.

For example, the first extension 540 may be spaced apart from the first zone S1 of the second coupling portion 510-1, the third zone S3 of the third coupling portion 510-2, the second connecting portion 510-3, the third connecting portion 530a and the fourth connecting portion 530b.

Although the distance between the first extension 540 and the second connecting portion 510-3 may be smaller than the distance between the first extension 540 and the first zone S1 of the second coupling portion 510-1 and the distance between the first extension 540 and the third zone S3 of the third coupling portion 510-2, the disclosure is not limited thereto.

The distance between the first extension 540 and the second connecting portion 510-3 may be, for example, within a range of 0.03 mm-0.2 mm. If the distance between the first extension 540 and the second connecting portion 510-3 is smaller than 0.03 mm, there may be spatial interference between the first extension 540 and the second connecting portion 510-3. Meanwhile, if the distance the first extension 540 and the second connecting portion 510-3 is larger than 0.2 mm, the distance may be increased, thereby making it difficult to form a damper between the first extension 540 and the second connecting portion 510-3.

In order to sufficiently ensure elimination of spatial interference and easy formation of a damper, the distance between the first extension 540 and the second connecting portion 510-3 may be within a range of 0.06 mm-0.15 mm.

Although the first extension 540 may be configured such that the width thereof is increased in the extension direction in order to increase a heat transmission area, the disclosure is not limited thereto. The first extension 540 may be embodied so as to have various shapes.

For example, although the first extension 540 may be configured to have at least one first vertex M1, which is positioned at the left side of the reference line 501, and at least one second vertex M2, which is positioned at the right side of the reference line 501, the disclosure is not limited thereto.

Although the outer portion 510 may be bilaterally symmetrical with respect to the reference line in order to support the housing 140 in the balanced state without eccentricity, the disclosure is not limited thereto. In another embodiment, the outer portion may not be bilaterally symmetrical.

For example, although the second and third coupling portions and the second connecting portions 510-1 to 510-3 may be bilaterally symmetrical with respect to the reference line (for example, 501), the disclosure is not limited thereto.

Although the first coupling portion 520 may be bilaterally symmetrical with respect to the reference line in order to support the housing 140 in the balanced state without eccentricity, the disclosure is not limited thereto. In another embodiment, the outer portion may not be bilaterally symmetrical.

Although the first connecting portion 530 may be bilaterally symmetrical with respect to the reference line in order to support the housing 140 in the balanced state without eccentricity, the disclosure is not limited thereto. In another embodiment, the outer portion may not be bilaterally symmetrical.

Although the first extension 540 may be bilaterally symmetrical with respect to the reference line in order to support the housing 140 in the balanced state without eccentricity, the disclosure is not limited thereto. In another embodiment, the outer portion may not be bilaterally symmetrical.

The reference lines 501 to 504 may be lines, which extend the central point 101 (see FIG. 7) and corresponding ones of the vertices (or corners) of the corner portions 501a to 501d of the housing 140.

Here, the central point 101 may be the center of the housing or the center of the upper springs 150-1 to 150-4z.

The first frame-connecting portions 153 of the first to fourth upper springs 150-1 to 150-4 may be rotationally symmetrical (for example, rotation of 90°) about the central point 101 (see FIG. 7).

Each of the second to fourth upper springs 150-2 to 150-4 may be configured to have a shape identical or similar to the first upper spring. For example, the description of the first upper spring 150-1 shown in FIG. 8 may be applied to each of the second to fourth upper springs 150-2 to 150-4.

Each of the second to fourth outer portions 510 to 510d of the second to fourth upper springs 150-2 to 150-4 may be a first coupling portion, a second coupling portion, a third coupling portion and a second connecting portion.

The shape of the first coupling portions of the second to fourth outer portions 510b to 510d may be identical to the shape of the first coupling portion 520 of the first upper spring 150-1, and the description of the first upper spring may be applied to the second to fourth outer portions. In other words, the description of the first coupling portion of the first outer portion 510a may be applied to the first coupling portion of each of the second to fourth outer portions 510b to 510d.

The shape of at least one second or third coupling portion of the second to fourth outer portions 510b to 510d may be different from the shape of the second or third coupling portion of the first outer portion.

The second coupling portion of the second outer portion 510b may include the first zone having a hole 152a2, which is disposed in one region of the second corner portion 501b and which is coupled to the first protrusion 143a1 of the second corner portion 501b. The second coupling portion of the second outer portion 510b may not include a zone corresponding to the second zone S2 of the second coupling portion 510-1 of the first outer portion 510a. Alternatively, although the second coupling portion of the second outer portion 510b may include a zone corresponding to the second zone of the second coupling portion 510-1 of the first outer portion 510a, the length of the zone may be smaller than the length of the second zone.

The coupling portion of the second outer portion 510b may include a third zone having a hole 152a1, which is formed in the other region of the second corner portion 501b and which is coupled to the first protrusion 143b1 of the second corner portion 501b, and a fourth zone, which is connected to the third zone and which extends to the upper surface of the third member of the housing 140 adjacent to the second corner portion 501b.

The fourth zone of the second outer portion 510b may be provided with the groove 81 in which the projection 31b of the housing 140 is disposed, and one end of the fourth zone may be provided with the hole 26 to which the second protrusion 32b of the housing 140 is coupled.

For example, the first protrusion 143b of the second corner portion 501b of the housing 140 may be fused to the hole 152a1 in the second coupling portion of the second outer portion 510b, and the protrusion 32b of the housing 140 may be fused to the hole 26 in the second coupling portion of the second outer portion 510b.

Since the protrusions 143b1 and 32b, which are positioned at both sides of the second protrusion 31b of the housing 140, are fused to the second outer portion 510b of the second upper spring 150-2, the embodiment is able to stably secure the second outer portion 510b of the second upper spring 150-2 to the housing 140 and to stably couple the other end of the second coil 170 to the second outer portion 510b of the second upper spring 150-2. Accordingly, the embodiment is able to prevent disconnection of or damage to the second coil 170 caused by external impact.

The second coupling portion of the third outer portion 510c may include the first zone, which is disposed at one region of the third corner portion 501 and which has a hole coupled to the first protrusion of the third corner portion 501c. The second coupling portion of the third outer portion 510c may not include a zone corresponding to the second zone S2 of the second coupling portion 510-1 of the first outer portion 510a. Alternatively, although the second coupling portion of the third outer portion 510c may include a zone corresponding to the second zone S2 of the second coupling portion 510-1 of the first outer portion 510a, the zone may have a smaller length.

The third coupling portion of the third outer portion 510c may be the same as the third coupling portion 510-2 of the first outer portion 510a, and the description of the third coupling portion 510-2 of the first outer portion 510a may be applied to the third coupling portion of the third outer portion 510c.

The second coupling portion of the fourth outer portion 510d may include the first zone, which is disposed at one region of the fourth corner portion 501d and which has a hole 152a2 coupled to the first protrusion 143b of the fourth corner portion 501d, and the second zone, which is connected to the first zone and which extends to the upper surface of the fourth side portion of the housing 140 adjacent to the fourth corner portion 501d.

The third coupling portion of the fourth outer portion 510d may include the third zone, which is disposed at the other region of the fourth corner portion 510d and which is coupled to the first protrusion 143a of the fourth corner portion 501d. The third coupling portion of the fourth outer portion 510d may not include a zone corresponding to the fourth zone of the first outer portion 510a. Alternatively, although the third coupling portion of the fourth outer portion 510d may include a zone corresponding to the fourth zone of the third coupling portion 510-2 of the first outer portion 510a, the zone may have a smaller length.

The description of the second connecting portion of the first outer portion 501a may be applied to the second connecting portion of each of the second to fourth outer portions 510b to 510d.

Although the shape of the first outer portion 510a is partially different from the shapes of the second to fourth outer portions 510b to 510d in FIG. 7, the disclosure is not limited thereto. In another embodiment, the shape of each of the first to fourth outer portions may be configured to be the same as the shape of the first outer portion 510a shown in FIG. 7.

In a further embodiment, the shape of at least one of the first to fourth outer portions of the upper elastic member 150 may be the same as the shape of at least one of the second to fourth outer portions 501b to 510d, or may be embodied as combinations of the shapes of the second to fourth outer portions 510b to 510d.

The lower elastic member 160 may include a second inner frame 161 coupled to the lower portion, the lower surface or the lower end of the bobbin 110, a second outer frame 162 coupled to the lower portion, the lower surface or the lower end of the housing 140, and a second frame-connecting portion 163 connecting the second inner frame 161 to the second outer frame 162.

The lower elastic member 160 may have therein the hole 161a, which is formed in the second inner frame 161 and which is coupled to the first lower coupling groove 117 in the bobbin 110 via a solder or a conductive adhesive member, and the hole 162a, which is formed in the second outer frame 162 and which is coupled to the second protrusion 147 of the housing 140.

Each of the first and second frame-connecting portions 153 and 163 of the upper and lower elastic members 150 and 160 may be bent or curved at least once so as to define a predetermined pattern. The upward and/or downward movement of the bobbin 110 in the first direction may be elastically (or flexibly) supported by virtue of positional variation and fine deformation of the first and second frame-connecting portions 153 and 163.

The lens moving apparatus 100 may further include the damping member or damper 91 (see FIG. 12A), which is disposed between the second connecting portions 510-3 of the upper springs 150-1 to 150-4 and the first extension 540. The damper 91 may serve to absorb or buffer vibrations of the support members 220 or to buffer movement of the support members 220.

For example, although the damper 91 may be brought into contact with the second connecting portion 510-3 and the first extension 540 and may be spaced apart from the second coupling portion 510-1 and the third coupling portion 510-2, the disclosure is not limited thereto.

For example, the damper 91 may be disposed between the side surface of the second connecting portion 510-3 and the side surface of the first extension 540. Furthermore, the damper 91 may also be disposed on the upper surface and/or the lower surface of the second connecting portion 510-3, and may also be disposed between the upper surface and/or the lower surface of the first extension 540.

Although the damper 91 may be spaced apart from the corner portions 501a to 501d of the housing 140, the disclosure is not limited thereto. In another embodiment, the damper 91 may also be brought into contact with the corner portions 501a to 501d of the housing 140.

Figure 13:
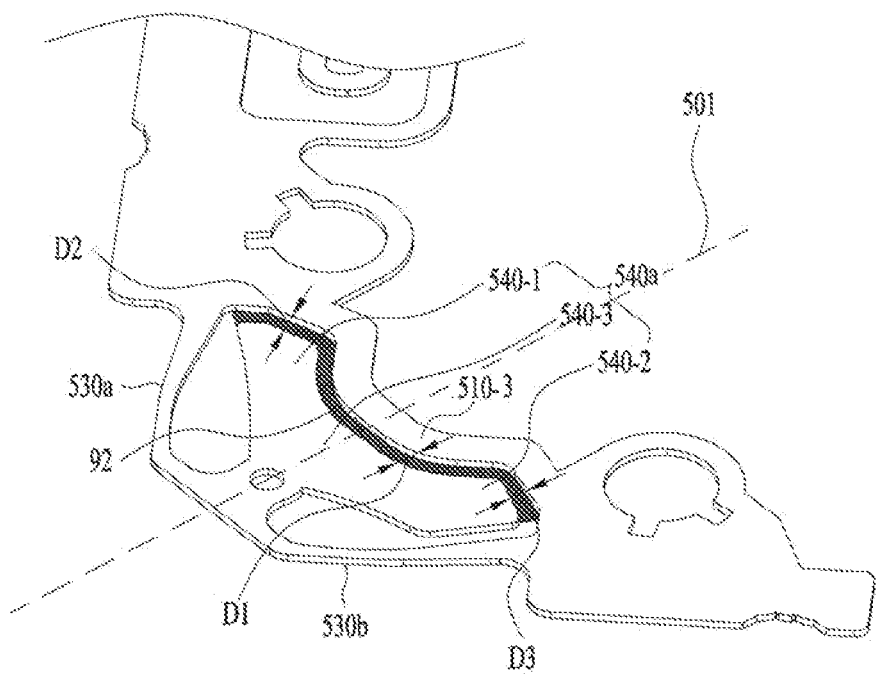
FIG. 13 illustrates a first extension and a damper according to another embodiment.

FIG. 13 illustrates a first extension 540a and a damper 92 according to another embodiment.

Referring to FIG. 13, although the first extension 540 shown in FIG. 8 extends from the first coupling portion 520 to the second connecting portion 510-3, the first extension 540a shown in FIG. 13 may include a second extension 540-1 extending from the first coupling portion 520 to the second coupling portion 510-1, a third extension 540-2 extending from the first coupling portion 520 to the third coupling portion 510-2, and a fourth extension 540-3 extending from the first coupling portion 520 to the second connecting portion 510-3 so as to connect the second extension 540-1 to the third extension 540-2.

The first extension 540*a* shown in FIG. 13 may further increase the surface area through which heat is transmitted to the first coupling portion 520, and may further improve solderability when the first coupling portion 520 is soldered to the support member 220.

In the embodiment shown in FIG. 8, the first distance between the second connecting portion 510-3 and the first extension 540 is smaller than the second distance between the second coupling portion 510-1 and the first extension 540 or the third distance between the third coupling portion 510-2 and the first extension 540.

In contrast, in the embodiment shown in FIG. 13, the first distance D1 between the second connecting portion 510-3 and the first extension 540*a* may be equal to the second distance D2 between the second coupling portion 510-1 and the first extension 540*a* and the third distance D3 between the third coupling portion 510-2 and the first extension 540*a* (D1=D2=D3). Consequently, the embodiment is able to increase the heat transmission area of the first extension 540*a*, for example, the area of the upper and lower surfaces of the first extension 540*a*, and to improve the solderability thereof.

For example, D1, D2 and D3 may be within a range of 0.03 mm-0.2 mm.

In order to ensure elimination of spatial interference between the first extension 540*a* and the coupling portions and easy formation of the damper, D1, D2 and D3 may be within a range of 0.06 mm-0.15 mm.

The lens moving apparatus 100 may further include the damping member or damper 92, which is disposed in at least one of the space between the second coupling portion 510-1 and the second extension 540-1, the space between the third coupling portion 510-2 and the third extension 540-2, and the space between the second connecting portion 510-3 and the fourth extension 540-3. The damping member or damper 92 may serve to absorb or buffer vibrations of the support members 220 or may serve to buffer movement of the support members 220.

For example, the damping member or damper 92 may be disposed between the side surfaces of the second and third coupling portions 510-1 and 510-2 and the side surfaces of the first extension 540*a* and between the side surface of the second connecting portion 510-3 and the side surface of the first extension 540*a*, and may be brought into contact with the side surfaces of the second and third coupling portions 510-1 and 510-3, the side surface of the second connecting portion 510-3 and the side surface of the first extension 540*a*.

For example, the damping member or damper 92 may be disposed on the upper surface and/or the lower surface of at least one of the second and third coupling portions 510-1 and 510-2 and the second connecting portion 510-3, and may also be disposed on the upper surface and/or the lower surface of the first extension 540*a*.

In another embodiment, the damping member may be disposed only between the second connecting portion 510-3 and the first extension 540*a*. Here, although D1 may be smaller than D2 and D3, the disclosure is not limited thereto. D1 may be larger than D2 and D3.

Although the damping member or damper 92 may be spaced apart from the corner portions 501*a* to 501*d* of the housing 140, the disclosure is not limited thereto. In another embodiment, the damping member or damper 92 may be brought into contact with the corner portions 501*a* to 501*d* of the housing 140.

In order to absorb or buffer vibrations of the bobbin 110, the lens moving apparatus 100 may further include first damping members (not shown), each of which is disposed between a corresponding one of the upper elastic members 150-1 to 150-4 and the housing 140.

For example, each of the first damping members (not shown) may be disposed in the space between the first frame-connecting portion 153 of a corresponding one of the upper springs 150-1 to 150-4 and the housing 140.

The lens moving apparatus 100 may further include second damping members (not shown), each of which is disposed between a corresponding one of the second frame-connecting portions 163 of the lower elastic members 160 and the housing 140.

The lens moving apparatus 100 may further include third damping members disposed between the support members 220 and the holes 147*a* in the housing 140.

Furthermore, the lens moving apparatus 100 may further include fourth damping members, which are disposed at the first coupling portions 520 and the first ends of the support members 220, and may further include fifth damping members, which are disposed at the other ends of the support members 220 and the circuit board 250.

For example, a damping member (not shown) may also be disposed between the inner surface of the housing 140 and the outer peripheral surface of the bobbin 110.

Next, the second coil 170 will be described.

The second coil 170 is disposed on the outer surface of the housing 140.

For example, the second coil 170 may be disposed on upper sides of the outer surfaces of the side portions 141 and 142 of the housing 140.

The second coil 170 may be a ring-shaped coil, which is wound about the optical axis in a clockwise or counterclockwise direction. For example, the second coil 170 may be a ring-shaped coil, which is wound around the outer surfaces of the first and second side portions 141 and 142 of the housing 140 about the optical axis in a clockwise or counterclockwise direction so as to surround the outer surfaces.

The second coil 170 may be positioned below the upper elastic member 150 but above the magnets 130.

The second coil 170 may not overlap the magnets 130 in a direction perpendicular to the optical direction when the AF movable unit (for example, the bobbin 110) is disposed at the initial position. The reason for this is to reduce the interference between the magnets 130 and the second coil 170.

The second coil 170 may be spaced apart from the first coil 120 by a predetermined distance in the optical direction, and may not overlap the first coil 120 in a direction perpendicular to the optical direction when the AF movable unit (for example, the bobbin 110) is disposed at the initial position. Maintaining the predetermined distance between the first coil 120 and the second coil 170 in the optical direction is to ensure the linearity of the induction voltage induced to the second coil 170 by the current of the first coil 120.

Although the second coil 170 may overlap the magnets 130 in the optical direction when the AF movable unit is disposed at the initial position, the disclosure is not limited thereto. In another embodiment, the two components may not overlap each other in the optical direction.

The second coil 170 may be disposed on the outer surfaces of the side portions 141 and 142 of the housing 140 such that at least a portion of the second coil 170 is positioned outside the support members 220. For example, the outside of the support members 220 may be the opposite side of the center of the opening in the housing 140 with respect to the support members 220.

The second coil 170 may be an induction coil for detecting the position or displacement of the AF movable unit, for example, the bobbin 110. For example, the second coil 170 may be embodied as a wire-type coil, an FPCB-type coil or a fine-pattern (FP)-type coil.

When the AF movable unit is moved due to the interaction between the first coil 120, to which a drive signal is applied, and the magnets 130, induction voltage may be generated in the second coil 170. The intensity of the induction voltage in the second coil 170 may vary according to the displacement of the AF movable unit. It is possible to detect the displacement of the AF movable unit by detecting the intensity of the induction voltage generated in the second coil 170. It is possible to perform AF feedback motion using the detected displacement of the AF movable unit, thereby enabling precise motion of AF feedback.

Figure 14:
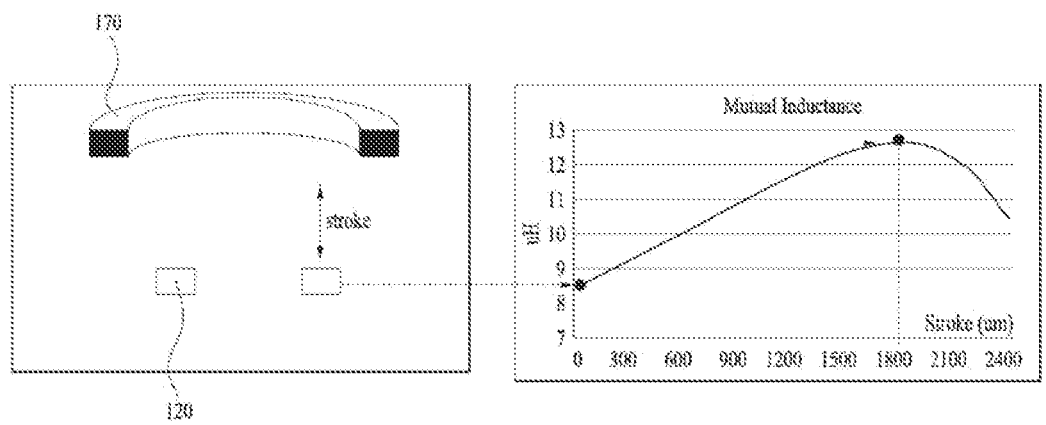
FIG. 14 is a view illustrating a mutual inductance according to the distance between the first coil and the second coil.

FIG. 14 illustrates a mutual inductance according to the distance between the first coil 120 and the second coil 170. In this drawing, the x-axis represents displacement of the AF movable unit, and the y-axis represents the intensity of the mutual inductance.

Referring to FIG. 14, as the distance between the first coil 120 and the second coil 170 is decreased with movement of the bobbin 110, the mutual inductance between the first coil 120 and the second coil 170 may be increased. As the mutual inductance is increased, the induction voltage induced to the second coil 170 may be increased.

Meanwhile, as the distance between the first coil 120 and the second coil 170 is increased, the mutual inductance between the first coil 120 and the second coil 170 may be decreased. As the mutual inductance is decreased, the induction voltage induced to the second coil 170 may be decreased.

Accordingly, it is possible to detect displacement of the movable unit based on the intensity of the induction voltage generated in the second coil 170.

Because implementation of autofocus feedback control typically requires a position sensor capable of detecting displacement of the AF movable unit, for example, the bobbin, and an additional power-connecting structure for driving the position sensor, there may be an increase in the price of the lens moving apparatus and difficulty in manufacturing operation.

Furthermore, a linear zone (hereinafter, referred to as a "first linear zone") in a graph plotted between the distance of movement of the bobbin and the magnetic flux of the magnet detected by the position sensor may be restricted by positional relationships between the magnet and the position sensor.

Since the embodiment does not require an additional position sensor for detecting the displacement of the bobbin 110, it is possible to reduce the cost of manufacturing the lens moving apparatus and to facilitate the manufacture thereof.

Furthermore, since mutual induction between the first coil 120 and the second coil 170 is employed, the linear zone in the graph plotted between the distance of movement of the bobbin 110 and the induction voltage of the second coil 170 may be increased. Accordingly, the embodiment is able to ensure linearity over a wider zone, to decrease a processing defect rate, and to perform more precise AF feedback control.

Next, the base 210, the support members 220, the third coil 230, the position sensor 240 and the circuit board 250 will be described.

The base 210 may be coupled to the cover member 300 so as to define a space for accommodating the bobbin 110 and the housing 140. The base 210 may have an opening corresponding to the opening in the bobbin 110 and/or the housing 140 and may have a shape that coincides with or corresponds to the shape of the cover member 300, for example, a square shape.

The base 210 may be positioned under the bobbin 110 and the housing 140 and may have a support groove or a support portion, which is formed in a surface of the base 210 that faces a terminal portion 253 of the circuit board 250.

The corners of the base 210 may have recesses 212. When each of the corners of the cover member 300 has a projected shape, the projected portion of the cover member 300 may be coupled to the base 210 at the recesses 212.

The base 210 may have position-sensor-mounting grooves 215-1 and 215-2, which are depressed from the upper surface of the base 210 and in which the position sensors 240a and 240b are disposed.

The position sensor 240, which is a position sensor for optical image stabilization (OIS) feedback, may include the first position sensor 240a and the second position sensor 240b.

The first and second position sensors 240a and 240b may be disposed in the position-sensor-mounting grooves 215a and 215b in the base 210 positioned under the circuit board 250, and may be conductively connected to the circuit board 250. Although the first and second sensors 240a and 240b may also be mounted on the rear surface of the circuit board 250, the disclosure is not limited thereto.

Each of the first and second position sensors 215a and 215b may receive a drive signal from the circuit board 250, and the output from each of the first and second position sensors 215a and 215b may be output to the circuit board 250.

The first and second position sensors 240a and 240b may detect the displacement of the housing 140 relative to the base 210 in a direction (for example, the X-axis or the Y-axis direction) perpendicular to the optical axis (that is, the Z-axis direction). For example, when the housing 140 is moved in the second direction and/or the third direction, the first and second position sensors 240a and 240b may detect variation in electromagnetic force generated by the magnets 130, and may output a signal based on the detected result.

For example, each of the first and second position sensors 240a and 240b may be embodied as a hall sensor alone, or may be embodied as a driver including a hall sensor. However, this is for illustration only, and any sensor other than one using magnetic force may be used as long as it can detect a position.

The third coil 230 may be disposed above the circuit board 250, and the first and second position sensors 240a and 240b may be disposed under the circuit board 250.

The circuit board 250 may be disposed on the upper surface of the base 210, and may include an opening or bore that corresponds to the opening in the bobbin 110, the opening in the housing 140 and/or the opening in the base 210.

The circuit board 250 may include at least one terminal portion 253, which is bent from the upper surface of the circuit board 250, and a plurality of terminals 251 provided on the terminal portion 253. Although the circuit board 250 may include two terminal portions, which are respectively disposed at two sides of the upper surface of the circuit board 250 that face each other, the disclosure is not limited thereto.

The circuit board 250 may include first terminals, which are conductively connected to the support members 220-1 to 220-4 connected to the first coil 120 and the second coil 170, and second terminals, which are conductively connected to the third coils 230-1 to 230-4.

Although the circuit board 250 may be an FPCB, the disclosure is not limited thereto. The terminals may be formed by forming terminals on the surface of a PCB or the surface of the base 210 through surface electrode technology.

The circuit board 250 may have holes 250a through which the support members 220-1 to 220-4 extend. The support members may be conductively connected to the circuit pattern formed on the lower surface of the circuit board 250 through the holes 250a in the circuit board 250 through a soldering process or the like.

In another embodiment, the circuit board 250 may not have the holes 250a, and the support members 220-1 to 220-4 may be conductively connected to the circuit pattern or the pad formed on the upper surface of the circuit board 250 through a soldering process or the like.

The circuit board 250 may further have holes, which are coupled to protrusions provided on the upper surface of the base 210 through thermal fusion bonding or bonding using an adhesive member.

The third coil 230 is disposed on the upper surface of the circuit board 250 so as to correspond to or be aligned with the magnets 130. The number of third coils 230 may be one or more, and may be equal to the number of magnets 130, without being limited thereto.

Although the third coil 230 may include, for example, a plurality of OIS coils 230-1 to 230-4, which are formed in an additional board 231 separated from the circuit board 250, the disclosure is not limited thereto. In another embodiment, the plurality of OIS coils 230-1 to 230-4 may be disposed on the circuit board 250 so as to be spaced apart from each other without an additional board or circuit member.

The board 231, in which the third coil 230 is formed, may have escape grooves 23, which are respectively formed in corners of the board 231 and through which the support members 220-1 to 220-4 respectively extend.

The OIS coils 230-1 to 230-4 may be conductively connected to the circuit board 250. A drive signal, for example, drive current, may be supplied to each of the OIS coils 230-1 to 230-4.

The magnets 130-1 to 130-4 and the OIS coils 230-1 to 230-4 may face each other or may be aligned with each other in a direction parallel to the optical axis. The housing 140 may be moved in the second and/or third direction by virtue of electromagnetic force caused by the interaction between the magnets 130 and the OIS coils 230-1 to 230-4 to which a drive signal is applied. The handshake may be implemented by controlling the movement of the housing 140.

Next, the support members 220 will be described.

Although the support members 220 may be coupled at first ends thereof to the upper elastic member 150 and at second ends thereof to the circuit board 250 via a solder or a conductive adhesive member, the disclosure is not limited thereto. In another embodiment, the second ends of the support members 220 may be coupled to the circuit member 231 and/or the base 210. In this case, the circuit member 231 or the base 210, which is coupled to the second ends of the support members 220, may be conductively connected to the circuit board 250.

The support members 220 may include a plurality of support members, and the plurality of support members 220-1 to 220-4 may be positioned so as to correspond to the second side portions 142 of the housing 140.

Each of the plurality of support members 220-1 to 220-4 may be coupled to the first coupling portion 520 of a corresponding one of the upper springs 150-1 to 150-4 via the solder 901, and may be conductively connected to the first coupling portion 520.

The plurality of support members 220-1 to 220-4 may support the bobbin 110 and the housing 140 such that the bobbin 110 and the housing 140 are movable in a direction perpendicular to the first direction.

Each of the plurality of support members 220-1 to 220-4 may be disposed adjacent to a corresponding one of the four second side portions 142. The support members 220-1 to 220-4 may be positioned inside the ring-shaped second coil 170.

Although one support member is disposed at each of the second side portions of the housing 140 in the embodiment shown in FIG. 9, the disclosure is not limited thereto.

In another embodiment, two or more support members may be disposed at each of the second side portions of the housing 140, and the upper elastic member 150 may include two or more upper elastic members, which are disposed at at least one of the second side portions of the housing 140 and which are separated and spaced apart from each other. For example, two support members, which are disposed at one of the second side portions of the housing 140, may be connected to a corresponding one of the two upper elastic members, which are disposed at the one second side portion and are separated from each other.

Each of the plurality of support members 220-1 to 220-4 may be spaced apart from the housing 140 and may be directly connected to the first coupling portion 520 of the first outer frame 152 of the upper springs 150-1 to 150-4.

In another embodiment, the support members 220 may be embodied as leaf springs, and may be disposed at the side portions 141 of the housing 140.

The drive signal from the circuit board 250 may be transmitted to the first coil 120 through the plurality of support members 220-1 to 220-4 and the upper springs 150-1 to 150-4, and the induction voltage output from the second coil 170 may be transmitted to the circuit board 250.

The induction voltage from the second coil 170 may be transmitted to the circuit board 250 through the second and third upper springs 150-2 and 150-3 and the second and third support members 220-2 and 220-3. Furthermore, the power or drive signal from the circuit board 250 may be transmitted to the first coil 120 through the first and fourth upper springs 150-1 and 150-4 and the first and fourth support members 220-1 and 220-4.

The plurality of support members 220-1 to 220-4 may be made of additional members separated from the upper elastic member 1150, and may be embodied as members having elastic supporting ability, for example, leaf springs, coil springs, suspension wires or the like. In another embodiment, the support members 220-1 to 220-4 may be integrally formed with the upper elastic member 1150.

Figure 11:
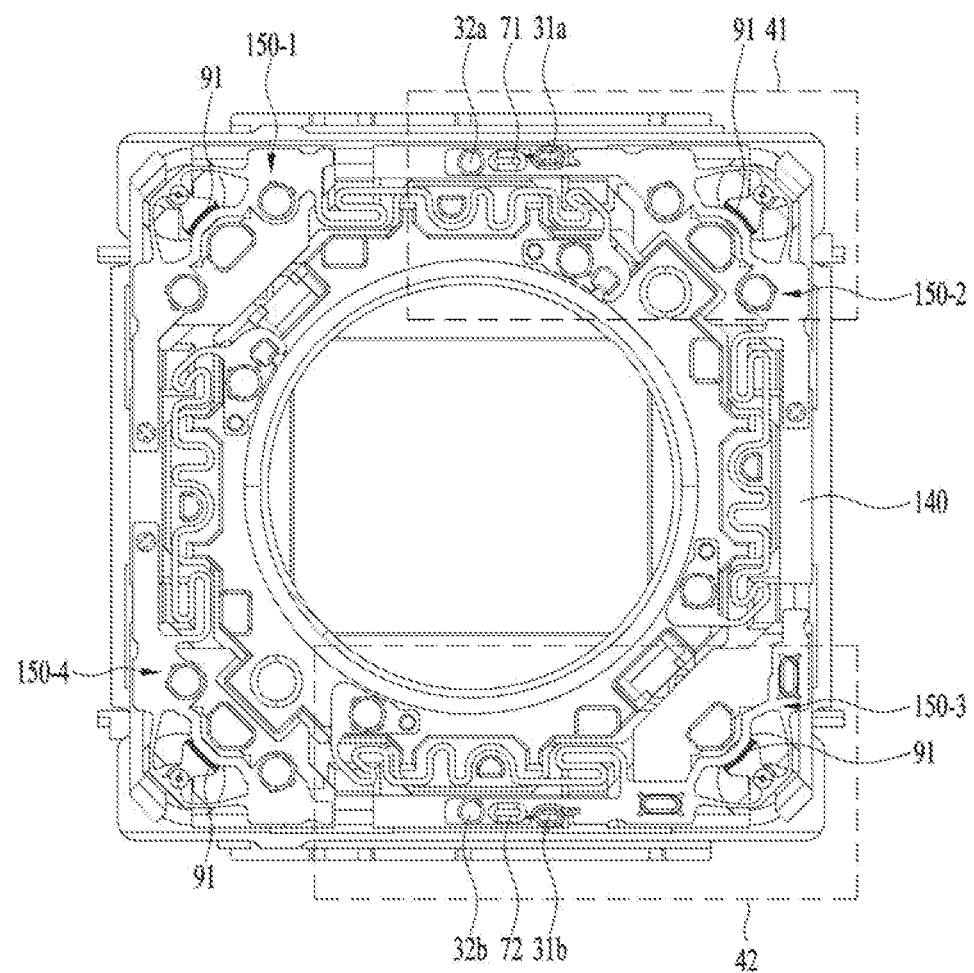
FIG. 11 is a plan view of FIG. 3.
Figure 12A:
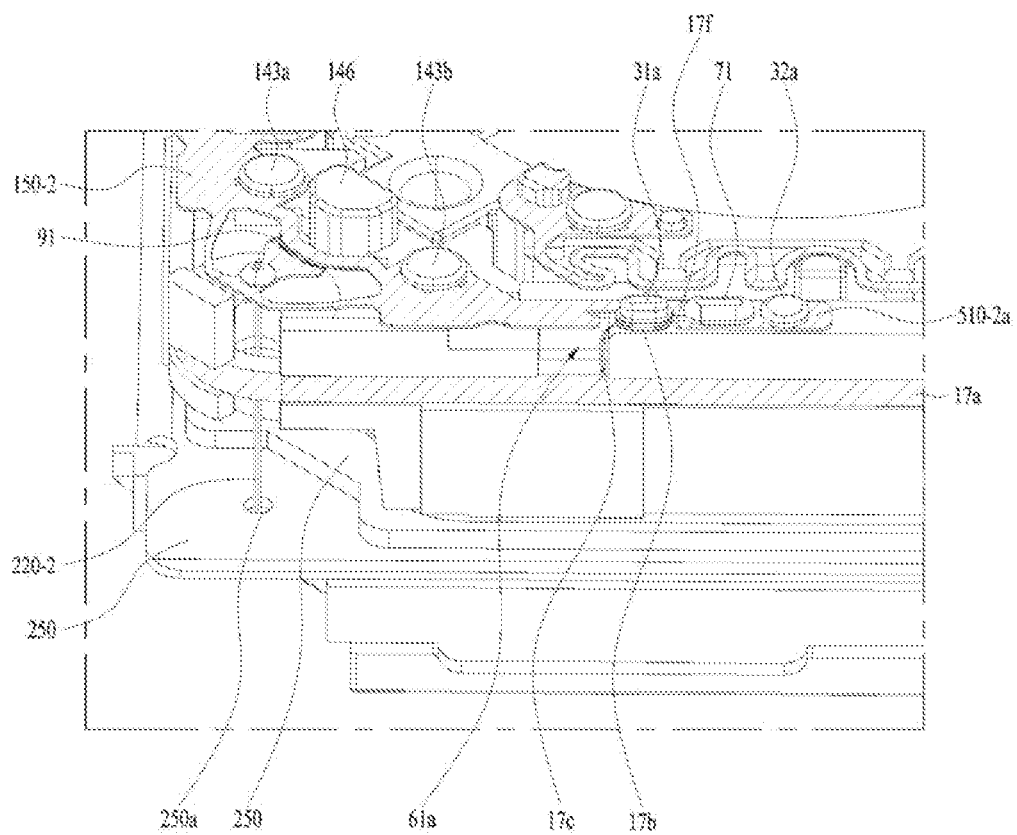
FIG. 12A is a perspective view of a first dotted area of FIG. 11.
Figure 12B:
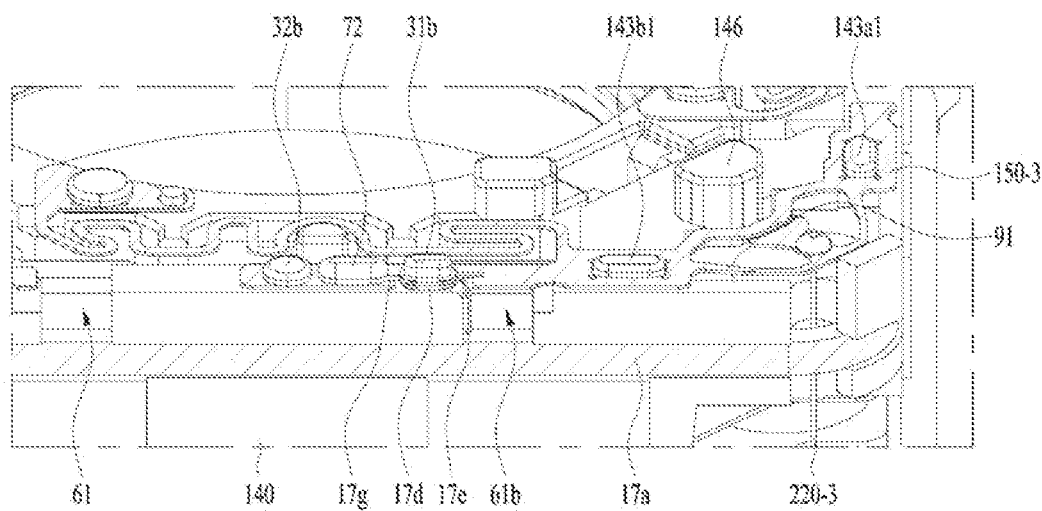
FIG. 12B is a perspective view of a second dotted area of FIG. 11.

FIG. 11 is a plan view of FIG. 3. FIG. 12A is a perspective view of a first dotted area 41 of FIG. 11. FIG. 12B is a perspective view of a second dotted area 42 of FIG. 11.

Referring to FIGS. 11, 12A and 12B, a portion of the second coil 170 may be wound at least one turn around the first projection 31a of the housing 140, may be coupled to the second zone S2 of the outer portion 510a of the upper spring (for example, 150-1) via the first solder 71, and may be conductively connected to the upper spring (for example, 150-1).

The other portion of the second coil 170 may be wound at least one turn around the second projection 31b, may be coupled to the second zone S2 of the outer portion 510d of the first outer frame 152 of the upper spring (for example, 150-2) via the second solder 72, and may be conductively connected to the upper spring (for example, 150-2).

A portion of the second coil 170 disposed on the housing 140 may be wound at least one turn around the first projection 31a of the housing 140 and may include a first extended line 17f, which extends to the first outer frame 152 of the upper spring 150-1. The first solder 71 may be disposed on the first extended line 17f and the first outer frame 152 of the first upper spring 150-1, and the first extended line 17f and the first outer frame 152 of the upper spring (for example, 150-1) may be conductively connected to each other via the first solder 71.

The other portion of the second coil 170 disposed on the housing 140 may be wound at least one turn around the second projection 31b of the housing 140, and may include a second extended line 17g, which extends to the first outer frame 152 of the upper spring 150-2. The second solder 72 may be disposed on the second extended line 17g and the first outer frame 152 of the first upper spring 150-2, and the second extended line 17g and the first outer frame 152 of the upper spring (for example, 150-2) may be conductively connected to each other via the second solder 72.

The reason why both ends of the second coil 170 are wound around the first and second projections 31a and 31b of the housing 140 is to solder the first end of the second coil 170 to the first outer frame of the first upper spring 150-1 and to solder the second end of the second coil 170 to the first outer frame of the second upper spring 150-2 without an additional line arrangement. Furthermore, the reason for this is to prevent disconnection of the second coil 170 caused by impacts and to prevent movement or vibration of the second coil 170 and to thus improve solderability upon soldering by stably and firmly securing both ends of the second coil 170 to the first and second projections 31a and 31b of the housing 140.

For example, the second coil 170 may include a first portion 17a disposed on the outer surface (for example, in the second coil-mounting groove 148) of the housing 140, a second portion 17b wound around the first projection 31a of the housing 140, a third portion 17c connecting one end of the first portion 17a to the second portion 17b, a fourth portion 17d wound around the second projection 31b of the housing 140, a fifth portion 17e connecting the other end of the first portion 17a to the fourth portion 17d, a sixth portion 17f extending from an end of the second portion 17b, and a seventh portion 17g extending from one end of the fourth portion 17d.

The third portion 17c of the second coil 170 may be disposed in the groove 61a positioned at the first side portion of the housing 140, and the fifth portion 17e of the second coil 170 may be disposed in the groove 61b positioned at the third side portion of the housing 140.

The first portion 17a, which is a portion at which induction voltage is generated due to the interaction with the first coil 120, may be represented as a "main body" of the second coil 170, and the second portion 17b may be represented as a "first winding portion". The third portion 17c may be represented as a "first connection line", and the fourth portion 17d may be presented as a "second winding portion". The fifth portion 17e may be represented as a "second connection line".

The first solder 71 may be spaced apart from the second portion 17b of the second coil 170, and the second solder 72 may be spaced apart from the fourth portion 17d of the second coil 170. Hence, it is possible to increase the length of the second coil 170.

The second coil 170 may include a conductive line and a sheath (for example, an insulation portion) surrounding the conductive line, and the first extended line 17f of the second coil 170 and the conductive line of the second extended line 17g may be exposed from the sheath. The reason for this is to conductively connect the second coil 170-1 to the first and second lower springs 160-1 and 160-2 through connection between the exposed portion of the conductive line of the first extended line 17f (or the second extended line 17g) and the first solder 71 (or the second solder 72).

Since the second coil 170 extends to the second zone S2 of the second coupling portion 510-1 of the first outer frame of the upper springs 150-2 and 150-3, it is possible to increase the length of the second coil 170 and thus to increase the resistance of the second coil 170 by virtue of the increased length of the second coil 170. Hence, since the induction voltage induced to the second coil 170 is increased, it is possible to improve the sensitivity required to detect the position of the bobbin 110 for AF feedback driving.

In another embodiment, the first and second extended lines 17f and 17g may be omitted, and the second coil 170 may include the first to fifth portions 17a to 17e. Furthermore, the first solder may be disposed on the second portion 17b of the second coil and the second outer frame of the upper spring 150-2, and the second solder may be disposed on the fourth portion of the second coil and the second outer frame of the upper spring 150-3. Here, the conductive line of the second and fourth portions 17b and 17d of the second coil may be exposed from the sheath, and the second coil and the upper springs 150-2 and 150-3 may be conductively connected to each other via the first and second solders.

In another embodiment, the second coil 170 may include a first portion 17a disposed on the outer surface (for example, the second coil-mounting groove 148) of the housing 140, a second portion 17b wound around the first projection 31a of the housing 140, a third portion 17d wound around the second projection 31b of the housing 140, a first connection line (or a first connection portion) 17c connecting one end of the first portion 17a to the second portion 17b, a second connection line (or a second connection portion) 17e connecting the other end of the first portion 17a to the third portion 17d, a first extension 17f extending from one end of the second portion 17b, and a second extension 17g extending from one end of the fourth portion 17d.

The embodiment shown in FIGS. 1 to 13 uses induction voltage caused by the mutual induction between the first coil 120 and the second coil 170 in order to perform AF feedback motion. In contrary, another embodiment may omit the second coil 170 shown in FIGS. 1 to 13 and may include an AF position sensor disposed on the housing 140 or the bobbin 110. In this case, the housing 140 or the bobbin 110 may be provided with a mounting groove, in which the AF position sensor is mounted. Furthermore, another embodiment may further include a circuit board disposed on the housing 140 or the bobbin 110 in order to mount the AF position sensor thereto.

Furthermore, another embodiment may further include an additional sensing magnet, which corresponds to the AF position sensor in a direction perpendicular to the optical axis. When the AF position sensor is disposed on the bobbin 110, the sensing magnet may be disposed on the housing 140. When the AF position sensor is disposed on the housing 140, the sensing magnet may be disposed on the bobbin 110.

The AF position sensor may be conductively connected to the circuit board 250 through the plurality of upper springs and/or at least one lower spring and the support members 220-1 to 220-4.

The AF position sensor may be embodied as a driver including a hall sensor, or may be embodied as a position sensor such as a hall sensor alone.

The AF position sensor may include two input terminals, to which a drive signal is supplied from the circuit board 250, and two output terminals which output a signal based on the result of detection of the intensity of electromagnetic force of the magnet and/or the sensing magnet with movement of the AF movable unit.

Meanwhile, the lens moving apparatuses according to the above-described embodiments may be used in various fields, such as, for example, those of a camera module or an optical device.

For example, the lens moving apparatus 100 according to the embodiment may be included in an optical instrument, which is designed to form the image of an object in a space using reflection, refraction, absorption, interference, diffraction or the like, which is the characteristic of light, to extend eyesight, to record an image obtained through a lens or to reproduce the image, to perform optical measurement, or to propagate or transmit an image. For example, the optical instrument according to the embodiment may include a smart phone and a portable terminal equipped with a camera.

Figure 15:
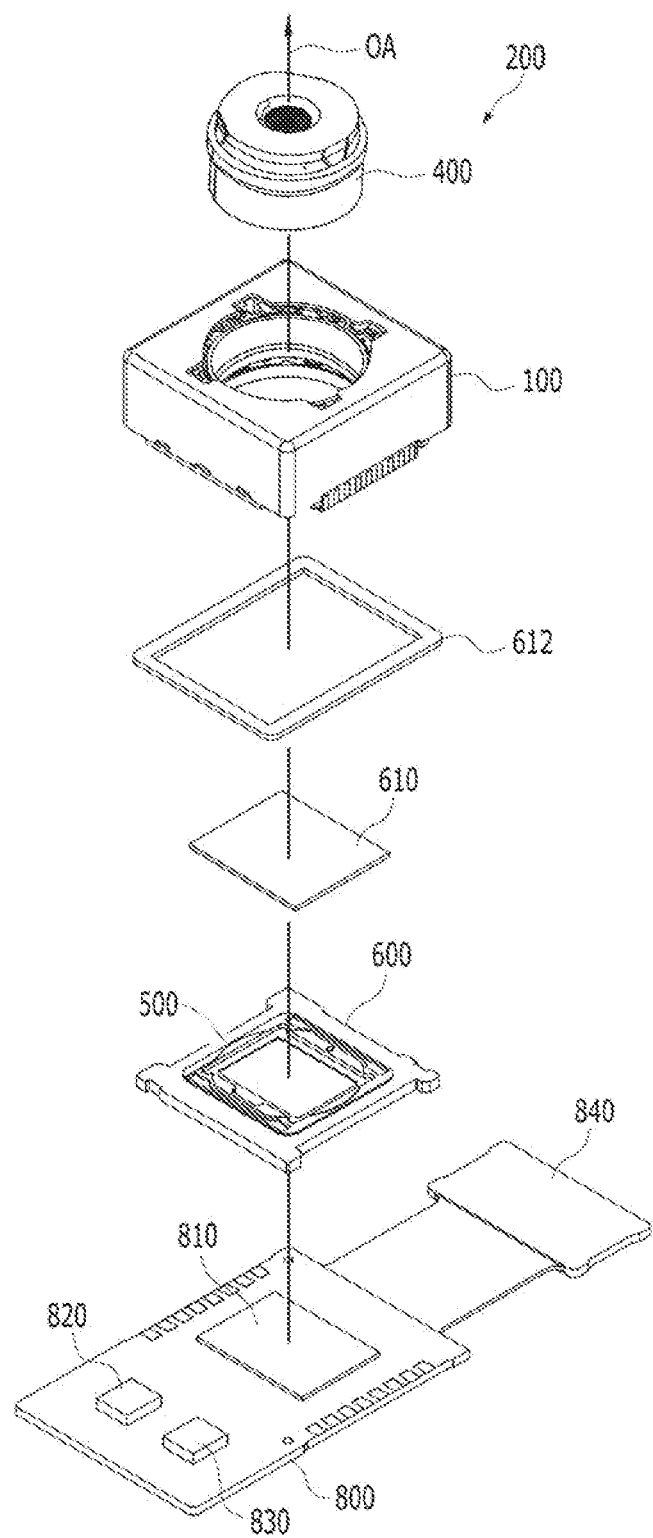
FIG. 15 is an exploded perspective view illustrating a camera module according to an embodiment.

FIG. 15 is an exploded perspective view illustrating a camera module 200 according to an embodiment.

Referring to FIG. 15, the camera module 200 may include a lens or a lens barrel 400, the lens moving apparatus 100, an adhesive member 612, a filter 610, a first holder 600, a second holder 800, an image sensor 810, a motion sensor 820, a controller 830, and a connector 840. The first holder 600 may also be represented as a "sensor base", and the second holder 800 may also be represented as a "circuit board" or a "board".

The lens or the lens barrel 400 may be mounted in the bobbin 110 of the lens moving apparatus 100.

The first holder 600 may be located under the base 210 of the lens moving apparatus 100. The filter 610 may be mounted on the first holder 600, and the first holder 600 may have a raised portion 500 on which the filter 610 is seated.

The adhesive member 612 may couple or attach the base 210 of the lens moving apparatus 100 to the first holder 600. In addition to the attachment function described above, the adhesive member 612 may serve to prevent contaminants from entering the lens moving apparatus 100.

The adhesive member 612 may be, for example, epoxy, thermohardening adhesive, or ultraviolet hardening adhesive.

The filter 610 may serve to prevent light within a specific frequency band that passes through the lens barrel 400 from being introduced into the image sensor 810. The filter 610 may be, for example, an infrared-light-blocking filter, without being limited thereto. In another embodiment, the filter 610 may be an infrared-transmitting filter. Here, the filter 610 may be oriented parallel to the X-Y plane.

The region of the first holder 600 in which the filter 610 is mounted may be provided with an opening in order to allow the light that passes through the filter 610 to be introduced into the image sensor 810.

The second holder 800 may be disposed under the first holder 600, and the image sensor 810 may be mounted on the second holder 800. The image sensor 810 may include an active area, an imaging area or an effective area, which is an area on which an image included in the light that passes through the filter 610 and that is introduced thereinto is formed.

The second holder 800 may include, for example, various circuits, devices, and a controller in order to convert the image, formed on the image sensor 810, into electrical signals and to transmit the electrical signals to an external component.

The second holder 800 may be embodied as a circuit board on which the image sensor 810 may be mounted, on which a circuit pattern may be formed, and to which various devices may be coupled.

The image sensor 810 may receive an image contained in the light introduced through the lens moving apparatus 100, and may convert the received image into electrical signals.

The filter 610 and the image sensor 810 may be spaced apart from each other so as to be opposite each other in the first direction.

The motion sensor 820 may be mounted on the second holder 800, and may be conductively connected to the controller 830 through the circuit pattern formed on the second holder 800.

The motion sensor 820 may output rotational angular speed caused by motion. The motion sensor 820 may be embodied as a dual-axis or triple-axis gyro sensor or an angular speed sensor.

The controller 830 may be mounted on the second holder 800. The second holder 800 may be conductively connected to the lens moving apparatus 100. For example, the second holder 800 may be conductively connected to the first coil 120 and the second coil 170 of the lens moving apparatus 100.

For example, a drive signal may be supplied to the first coil 120 through the second holder 800, and the induction voltage from the second coil 170 may be transmitted to the second holder 800. For example, the induction voltage from the second coil 170 may be received by the controller 830.

The connector 840 may be conductively connected to the second holder 800, and may have a port for the electrical connection of an external component.

The image sensor 810 may include a pixel array including a plurality of unit pixels, a sensing controller for providing control signals for controlling transistors included in the unit pixels and an A/D converter for converting an analog signal output from the unit pixels of the pixel array 905 into a digital signal.

Figure 16:
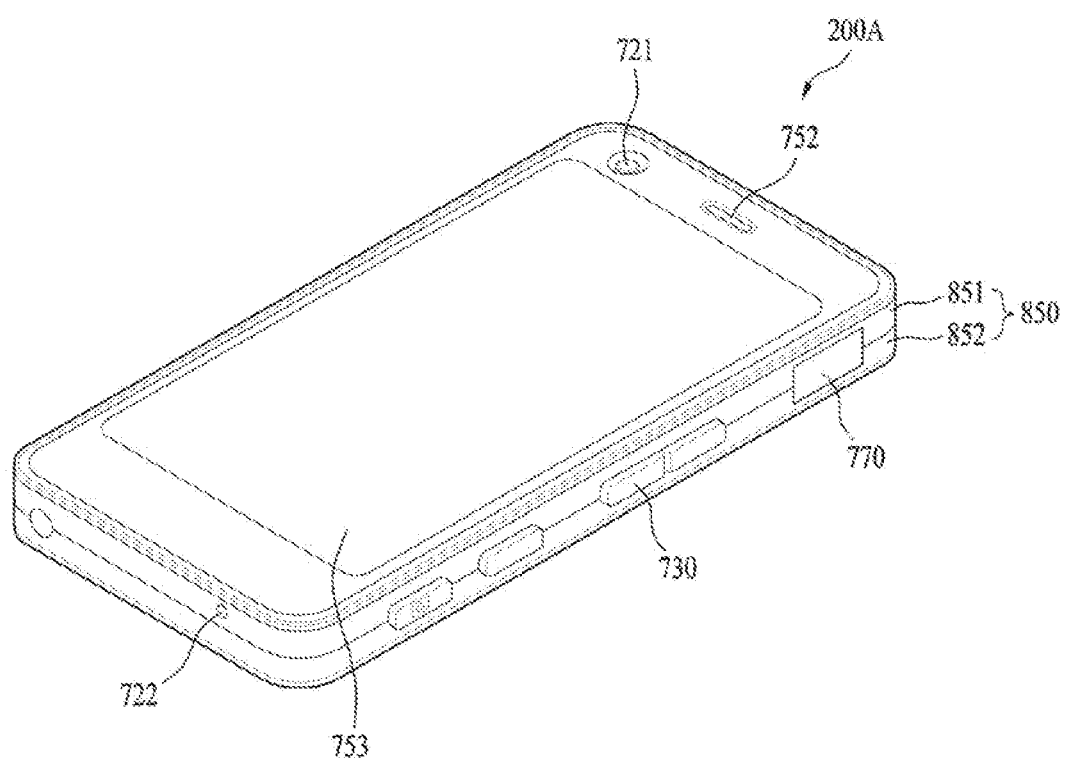
FIG. 16 is a perspective view of a portable terminal according to an embodiment.

FIG. 16 is a perspective view illustrating a portable terminal 200A according to an embodiment. FIG. 18 is a view illustrating the configuration of the portable terminal 200A illustrated in FIG. 17.

Figure 17:
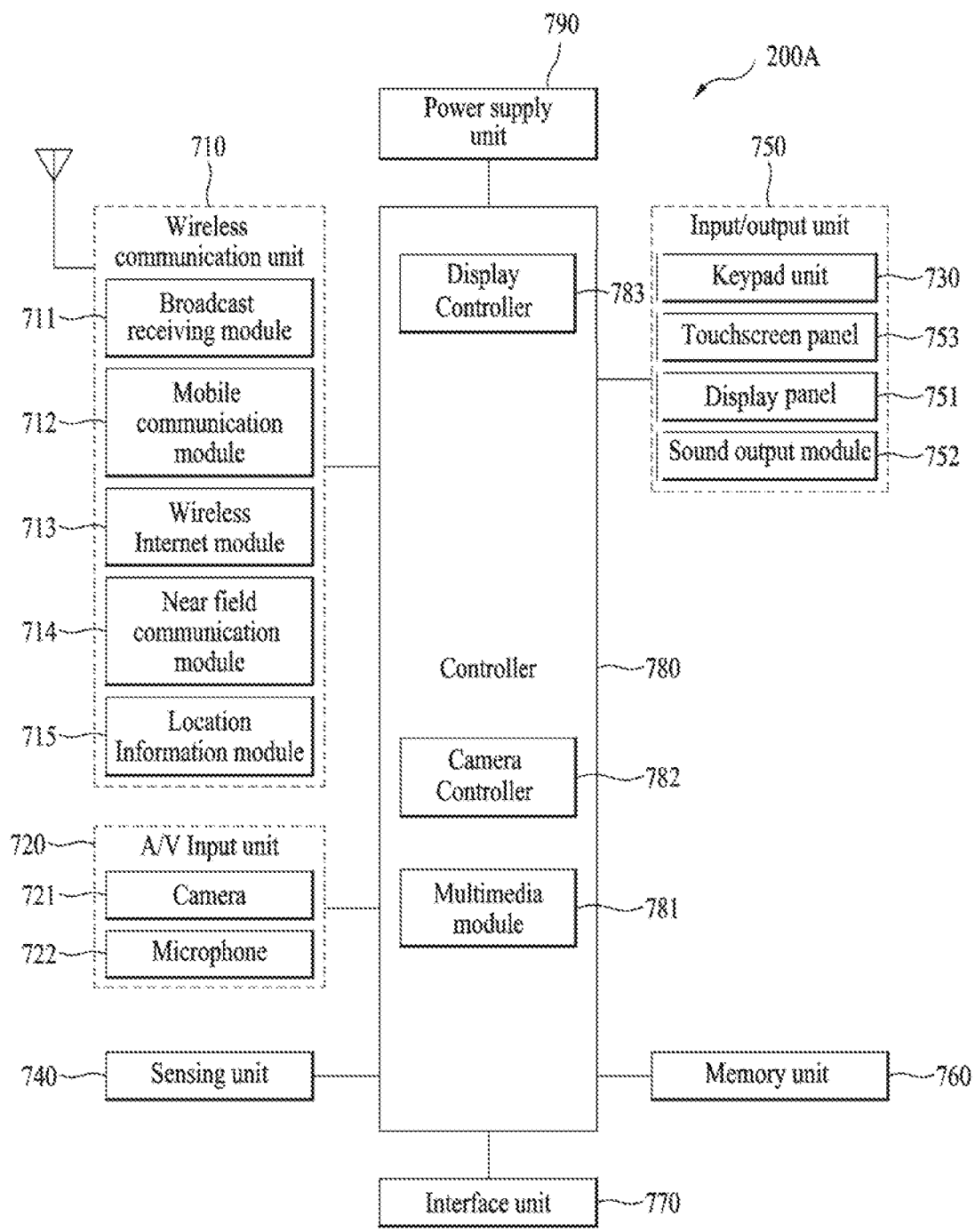
FIG. 17 is a view illustrating the configuration of the portable terminal illustrated in FIG. 16.

Referring to FIGS. 16 and 17, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 16 has a bar shape, without being limited thereto, and may be any of various types such as, for example, a slide type, a folder type, a swing type, or a swivel type, in which two or more sub-bodies are coupled so as to be movable relative to each other. The body 850 may include a case (e.g. casing, housing, or cover) defining the external appearance of the terminal.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may be the camera 200 including the camera module 200 according to the embodiment.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals applied thereto.

The sound output module 752 may output audio data received from the wireless communication unit 710 in, for example, a call signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may store programs for the processing and control of the controller 780. For example, the memory unit 760 may store images captured by the camera 721, for example, pictures or moving images.

The interface unit 770 may receive power or data from the external component, and may transmit the same to respective constituent elements inside the terminal 200A, or may transmit data inside the terminal 200A to the external component.

The controller 780 may control the general operation of the terminal 200A. For example, the controller 780 may perform control and processing related to, for example, voice calls, data communication, and video calls.

The controller 780 may include a multimedia module 781 for multimedia playback, a camera controller 782 for controlling a camera, and a display controller 783 for controlling the input/output unit 750.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configuration, effects and the like exemplified in the respective embodiments may be combined with other embodiments or modified by those skilled in the art. Accordingly, content related to these combinations and modifications should be construed as falling within the scope of the embodiments.

INDUSTRIAL APPLICABILITY

The embodiments may be applied to a lens moving apparatus capable of improving solderability, and a camera module and an optical device each including the lens moving apparatus.

The invention claimed is:

1. A lens moving apparatus comprising:
a housing;
a bobbin disposed in the housing;
a magnet disposed on the housing;
a first coil disposed on the bobbin to be opposite to the magnet;
an upper elastic member comprising an inner frame couple to an upper portion of the bobbin, an outer frame coupled to an upper portion of the housing, and a frame connecting portion connecting the inner frame and the outer frame;
a circuit board disposed under the housing; and
a support member conductively connecting the upper elastic member and the circuit board,
wherein the upper elastic member comprises:
an outer portion coupled to the upper portion of the housing;
a first coupling portion coupled to an end portion of the support member; and
a first connecting portion connecting the outer portion and the first coupling portion, and
wherein a width of the first connecting portion is smaller than a width of the outer portion.

2. The lens moving apparatus according to claim 1, wherein the bobbin comprises a first guide portion configured to serve to guide the frame connecting portion.

3. The lens moving apparatus according to claim 1, wherein the bobbin comprises an upper protrusion fused to the inner frame of the upper elastic member.

4. The lens moving apparatus according to claim 1, wherein the bobbin comprises a threaded line for engagement with a lens barrel or a lens.

5. The lens moving apparatus according to claim 1, wherein the bobbin comprises a jig-holding grooves formed in an upper surface thereof.

6. The lens moving apparatus according to claim 5, wherein the jig-holding grooves are formed in upper surfaces of side portions of the bobbin that are opposite each other.

7. The lens moving apparatus according to claim 1, wherein a drive signal is applied to the first coil and the drive signal is AC current.

8. The lens moving apparatus according to claim 1, comprising a lower elastic member coupled to a lower portion of the bobbin and a lower portion of the housing.

9. The lens moving apparatus according to claim 8, wherein the first coil is conductively connected to at least one of the upper elastic member and the lower elastic member.

10. The lens moving apparatus according to claim 1, wherein the housing comprises a hole through which the support member passes.

11. The lens moving apparatus according to claim 10, wherein the hole is formed at a corner of the housing.

12. The lens moving apparatus according to claim 10, wherein a diameter of the hole is gradually increased in a direction toward a lower surface of the housing from an upper surface of the housing.

13. The lens moving apparatus according to claim 10, comprising a damper disposed in the hole of the housing.

14. The lens moving apparatus according to claim 10, comprising a cover member configured to accommodate the housing.

15. The lens moving apparatus according to claim 14, wherein the cover member is made of a non-magnetic material.

16. The lens moving apparatus according to claim 14, comprising:
   a second guide portion formed at a corner of the housing; and
   a stopper formed at the corner of the housing to be space apart from the second guide portion.

17. The lens moving apparatus according to claim 16, wherein the hole of the housing is positioned between the second guide portion and the stopper, when viewed from above.

18. The lens moving apparatus according to claim 1, wherein the housing comprises at least one protrusion coupled to the outer frame of the upper elastic member.

19. A lens moving apparatus comprising:
   a housing;
   a bobbin disposed in the housing:
   a magnet disposed on the housing;
   a first coil disposed on the bobbin to be opposite to the magnet;
   an upper elastic member comprising an outer portion coupled to an upper portion of the housing, a first coupling portion and a connecting portion connecting the outer portion and the first coupling portion;
   a circuit board disposed under the housing;
   a support member conductively connecting the upper elastic member and the circuit board, the support member having an end portion coupled to the first coupling portion; and
   a damper disposed on the outer portion of the upper elastic member,
   wherein the outer portion comprises a second coupling portion disposed at one portion of the housing, and a third coupling portion disposed at another portion of the housing,
   wherein the connecting portion comprises a first connecting portion connecting the first coupling portion and the second coupling portion and a second connecting portion connecting the first coupling portion and the third coupling portion, and
   wherein a width of the first connecting portion is smaller than a width of the second coupling portion and a width of the third coupling portion.

20. A camera module comprising:
   a lens barrel;
   the lens moving apparatus for moving the lens barrel according to claim 1; and
   an image sensor.

* * * * *